(12) United States Patent
Ohtake

(10) Patent No.: US 7,385,766 B2
(45) Date of Patent: Jun. 10, 2008

(54) VARIABLE FOCAL LENGTH LENS SYSTEM AND IMAGE CAPTURING APPARATUS

(75) Inventor: Motoyuki Ohtake, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/700,847

(22) Filed: Feb. 1, 2007

(65) Prior Publication Data
US 2007/0201145 A1    Aug. 30, 2007

(30) Foreign Application Priority Data
Feb. 13, 2006    (JP)    ............................ P2006-034905

(51) Int. Cl.
*G02B 15/14* (2006.01)
(52) U.S. Cl. .................. 359/676; 359/684; 359/685
(58) Field of Classification Search ................ 359/676, 359/684, 685, 687
See application file for complete search history.

(56) References Cited

U.S. PATENT DOCUMENTS

| | | | |
|---|---|---|---|
| 5,548,445 A | 8/1996 | Yahagi | |
| 5,561,560 A | 10/1996 | Tsutsumi | |
| 2003/0117717 A1 | 6/2003 | Ohtake et al. | |
| 2003/0231388 A1 | 12/2003 | Hamano et al. | |
| 2005/0088756 A1 | 4/2005 | Yamada | |
| 2005/0168832 A1 | 8/2005 | Hamano | |
| 2007/0188887 A1* | 8/2007 | Ohtake | 359/687 |
| 2007/0263299 A1* | 11/2007 | Ohtake | 359/774 |
| 2007/0291375 A1* | 12/2007 | Ohtake et al. | 359/687 |

FOREIGN PATENT DOCUMENTS

| | | | |
|---|---|---|---|
| EP | 1818707 A1 * | 8/2007 | |
| JP | 2002-098893 | 4/2002 | |
| JP | 2002-156581 | 5/2002 | |
| JP | 2003-295059 | 10/2003 | |
| JP | 2005-128186 | 5/2005 | |
| JP | 2005-215385 | 8/2005 | |

OTHER PUBLICATIONS

European Search Report, Application No. 07102185.1-1524: Dated: Jun. 12, 2007.

* cited by examiner

*Primary Examiner*—David N Spector
(74) *Attorney, Agent, or Firm*—Rader Fishman & Grauer PLLC; Ronald P. Kananen

(57) ABSTRACT

A variable focal length lens system includes first to fourth lens groups having positive, negative, positive, and positive powers, respectively, and a fifth lens group arranged in this order from an object side. When a lens zoom position is changed from a wide-angle to a telephoto, the first to fourth groups are movable and the second group is moved towards the image side and the third group is moved towards the object side so that a distance between the first and second groups increases and a distance between the second and third groups decreases, and the fourth group is moved along an optical axis direction so as to compensate for the positional change in the image plane. The fifth group includes a negative subgroup having negative power and a positive subgroup disposed on the image side of the negative subgroup and having positive power, and a predetermined condition is satisfied.

8 Claims, 15 Drawing Sheets

VARIABLE FOCAL LENGTH LENS SYSTEM AND IMAGE CAPTURING APPARATUS

CROSS REFERENCES TO RELATED APPLICATIONS

The present invention contains subject matter related to Japanese Patent Application JP 2006-034905 filed in the Japanese Patent Office on Feb. 13, 2006, the entire contents of which are incorporated herein by reference.

BACKGROUND OF THE INVENTION

1. Field of the Invention

The present invention generally relates to a variable focal length lens system and an image capturing apparatus including the variable focal length lens system and, in particular, to a variable focal length lens system having a zoom ratio greater than 10 and an image capturing apparatus, such as a video camera or a digital still camera, including the variable focal length lens system.

2. Description of the Related Art

To record a subject image in cameras, a method for recording the subject image by converting the intensity of light of the subject image to an electrical output using an image pickup device including photoelectric transducers (such as charge coupled devices (CCDS) or complementary metal-oxide semiconductors (CMOSs)) has been known.

In recent years, microfabrication technology has been extensively developed. Accordingly, the speed of central processing units (CPUs) has been increased and the density of recording mediums has been increased. Thus, a large volume of image data that was unable to be processed before can now be processed at a high speed. In addition, the density of light receiving elements has been increased while the size of the light receiving elements has been decreased. The increased density of the light receiving elements allows a camera to record an image of high spatial frequency. The decreased size of the light receiving elements allows the size of the body of the camera to be decreased.

However, the increased density and decreased size of the light receiving elements reduce the light receiving area of each of the photoelectric transducers, and therefore, the intensity of the electrical output is decreased. Thus, the effect of noise on the electrical output increases. To reduce the effect of noise, an amount of light received by the light receiving element is increased by increasing the aperture ratio of an optical system or by mounting a microlens element immediately before each of the light receiving elements, forming what is known as a "microlens array". Although the microlens array leads a light ray between the neighboring light receiving elements to the light receiving elements, the microlens array imposes a constraint on the position of the exit pupil of a lens system. When the position of the exit pupil of a lens system is close to the light receiving element, that is, when the angle between the light ray and the optical axis of a chief light ray that reaches the light receiving element is large, the angle between an off-axis ray propagating towards the periphery of a screen and the optical axis is made to be large. As a result, the off-axis ray does not reach the light receiving element, and therefore, an insufficient amount of light is received.

In recent years, as digital cameras have become more widely used, digital cameras have been required to meet a wide variety of user needs.

A zoom lens having a variable magnification ratio greater than 10 allows a camera to capture a significantly magnified image of a subject. In particular, since users of a fixed-lens camera cannot interchange lenses, some users require a lens system of a high variable magnification ratio even though the size of the body of the camera is increased.

For example, Japanese Unexamined Patent Application Publication No. 2005-215385, Japanese Unexamined Patent Application Publication No. 2003-295059, and Japanese Unexamined Patent Application Publication No. 2005-128186 describe zoom lenses having a variable magnification ratio more than 10.

The zoom lenses described in Japanese Unexamined Patent Application Publication Nos. 2005-215385 and 2003-295059 include a first lens group having a positive refractive power, a second lens group having a negative refractive power, a third lens group having a positive refractive power, and a fourth lens group having a positive refractive power in this order from the object side. When the lens zoom position changes from a wide-angle position to a telephoto position, the first lens group is moved towards the object side, the second lens group is moved towards the image plane side, the third lens group is temporarily moved towards the object side and, subsequently, is moved towards the object side, and the fourth lens group is temporarily moved towards the object side and, subsequently, is moved towards the image plane side. In addition, in the zoom lens described in Japanese Unexamined Patent Application Publication No. 2005-215385, an aperture stop located between the second lens group and the third lens group can be moved independently from the other lens groups.

The zoom lens described in Japanese Unexamined Patent Application Publication No. 2005-128186 includes a first lens group having a positive refractive power, a second lens group having a negative refractive power, a third lens group having a positive refractive power, and a fourth lens group having a positive refractive power in this order from the object side. When the lens position changes from a wide-angle position to a telephoto position, the first and third lens groups are stationary in the optical axis direction, the second lens group is moved towards the image-plane side, and the fourth lens group is moved so as to compensate for the change in the position of the image plane due to the movement of the second lens group.

SUMMARY OF THE INVENTION

However, in the known zoom lenses, only the second lens group is responsible for a magnifying operation, which is problematic.

For this reason, the variation in off-axis aberration occurring in the second lens group is significant in accordance with the change in the lens zoom position. Accordingly, it is difficult to achieve a high variable magnification and a high performance at the same time.

In addition, in the known zoom lenses, only the third lens group is responsible for an operation of correcting the majority of aberrations, which is problematic.

This is because, although the third lens group has a strong positive refractive power, the third lens group needs to include a positive subgroup having a positive refractive power and a negative subgroup having a negative refractive power.

To converge a strongly diverged light beams output from the second lens group, the third lens group has a strong refractive power. At the same time, since only the second lens group has a negative refractive power, the third lens group includes a positive subgroup having a positive refractive power and a negative subgroup having a negative refractive power so as to sufficiently correct a negative distortion which tends to occur at the wide-angle position.

Therefore, the positive subgroup disposed in the third lens group has a strong refractive power. At the same time, the performance significantly deteriorates since the negative subgroup and the positive subgroup become eccentric.

Accordingly, the present invention provides a variable focal length lens system that can provide a high performance and a high variable magnification at the same time and an image capturing apparatus including the variable focal length lens system.

According to an embodiment of the present invention, a variable focal length lens system includes a first lens group having a positive refractive power, a second lens group having a negative refractive power, a third lens group having a positive refractive power, a fourth lens group having a positive refractive power, and a fifth lens group arranged in this order from an object side to an image plane side. When a lens zoom position is changed from a wide-angle position at which a focal length of the variable focal length lens system is the shortest to a telephoto position at which the focal length is the longest, at least the first to fourth lens groups are movable and the second lens group is moved towards the image plane side and the third lens group is moved towards the object side so that a distance between the first lens group and the second lens group increases and a distance between the second lens group and the third lens group decreases, and the fourth lens group is moved along an optical axis direction so as to compensate for the change in the position of the image plane caused by the movement of each lens group. The fifth lens group includes a negative subgroup having a negative refractive power and a positive subgroup disposed on the image plane side of the negative subgroup and having a positive refractive power, and the following conditional expression (1)

is satisfied:

$$0.5 < (\beta 2t/\beta 2w)/Z < 0.85 \quad (1)$$

where $\beta 2t$=the lateral magnification of the second lens group at the telephoto position, $\beta 2w$=the lateral magnification of the second lens group at the wide-angle position, and Z=a zoom ratio.

According to another embodiment of the present invention, an image capturing apparatus includes the above-described variable focal length lens system and an image sensor for converting an optical image formed through the variable focal length lens system to an electrical signal.

According to the present invention, a variable focal length lens system that can provide a high optical performance and a high variable magnification at the same time and an image capturing apparatus including the variable focal length lens system can be achieved.

DESCRIPTION OF THE PREFERRED EMBODIMENTS

Figure 1:
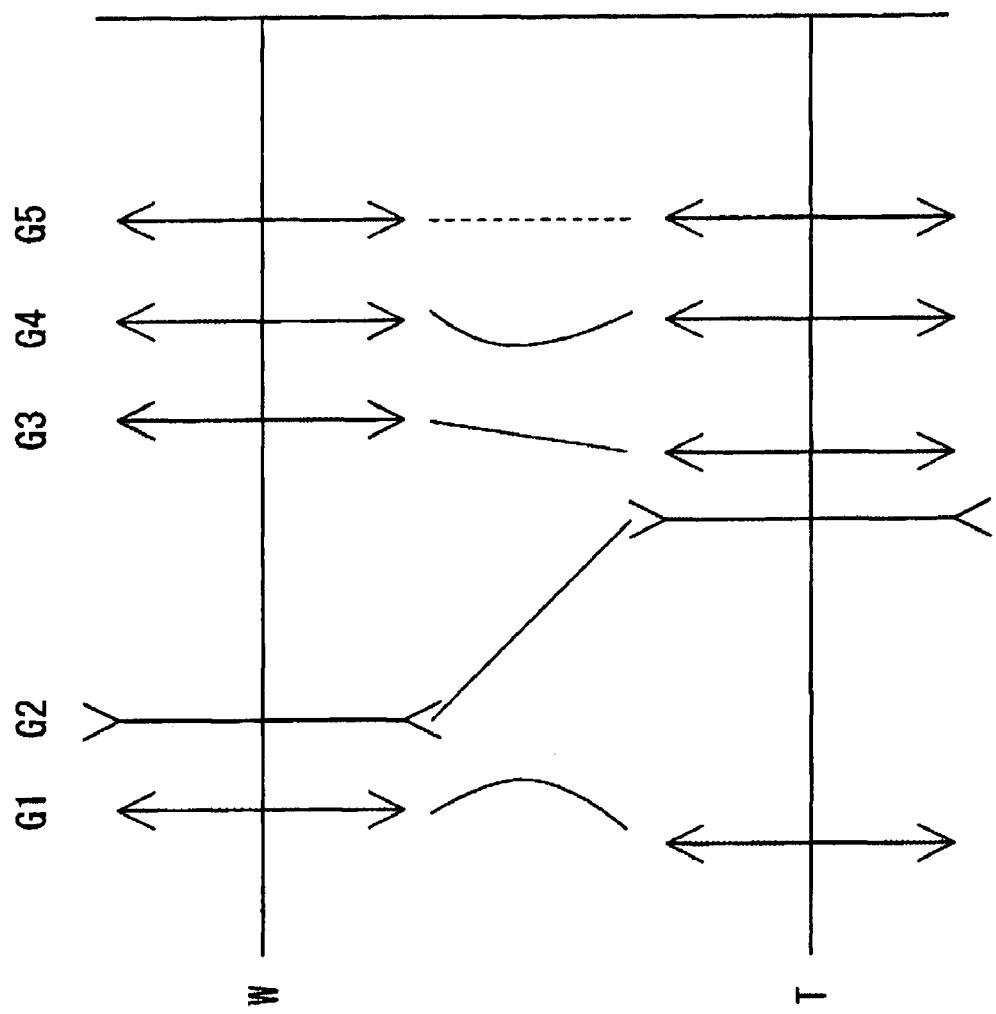
FIG. 1 illustrates a refractive-power arrangement of a variable focal length lens system according to an exemplary embodiment of the present invention.

Variable focal length lens systems and image capturing apparatuses according to exemplary embodiments of the present invention are described below with reference to the accompanying drawings.

The variable focal length lens systems of the present invention can be achieved by the following first to sixth exemplary embodiments.

First Exemplary Embodiment

A zoom lens according to a first exemplary embodiment includes a first lens group having a positive refractive power, a second lens group having a negative refractive power, a third lens group having a positive refractive power, a fourth lens group having a positive refractive power, and a fifth lens group arranged in this order from the object side. When a lens zoom position is changed from a wide-angle position at which the focal length is at a minimum to a telephoto position at which the focal length is at a maximum, at least the first to fourth lens groups are movable. The second lens group is moved towards the image-plane side and the third lens group is moved towards the object side so that the distance between the first lens group and the second lens groups is increased and the distance between the second lens group and the third lens groups is decreased. The fourth lens group is moved in the optical axis direction so as to compensate for the change in the position of the image plane due to the movements of the lens groups. The fifth lens group includes a negative subgroup having a negative refractive power and a positive subgroup disposed on the image-plane side of the negative subgroup and having a positive refractive power. In addition, the following conditional expression is satisfied:

$$0.5 < (\beta 2t/\beta 2w)/Z < 0.85 \qquad (1)$$

where $\beta 2t$=the lateral magnification of the second lens group in the telephoto position, $\beta 2w$=the lateral magnification of the second lens group in the wide-angle position, and Z=a zoom ratio.

Therefore, according to the present exemplary embodiment, the variable focal length lens system can provide a high variable magnification and a high performance at the same time by reducing the level of responsibility imposed on the second lens group in performing variable magnification.

Second Exemplary Embodiment

According to a second exemplary embodiment, a variable focal length lens system is similar to the variable focal length lens system according to the first exemplary embodiment. Let f5n denote the focal length of the negative subgroup included in the fifth lens group and fw denote the focal length of the whole lens system at the wide-angle position. Then, the variable focal length lens system further satisfies the following conditional expression:

$$2.5 < |f5n|/fw < 5 \qquad (2)$$

Thus, the performance can be further increased.

Third Exemplary Embodiment

According to a third exemplary embodiment, a variable focal length lens system is similar to the variable focal length lens system according to the first embodiment or the second embodiment. However, the fifth lens group is stationary in the optical axis direction regardless of the lens zoom position. Thus, the lens barrel structure can be simplified.

Fourth Exemplary Embodiment

According to a fourth exemplary embodiment, a variable focal length lens system is similar to the variable focal length lens system according to the first embodiment or the second embodiment. However, an aperture stop is disposed adjacent to the third lens group. Let Dsw denote a distance between the aperture stop and the image plane at the wide-angle position and TLw denote the total length of the lens system at the wide-angle position. Then, the variable focal length lens system further satisfies the following conditional expression:

$$0.3 < Dsw/TLw < 0.4 \qquad (3)$$

Thus, the reduction of the diameter of the lens and the high performance can be achieved at the same time.

Fifth Exemplary Embodiment

According to a fifth exemplary embodiment, a variable focal length lens system is similar to the variable focal length lens system according to the first embodiment or the second embodiment. However, the variable focal length lens system further satisfies the following conditional expression:

$$0.25 < 1/|\beta 2t| < 0.45 \qquad (4)$$

Thus, the performance can be further increased.

Sixth Exemplary Embodiment

According to a sixth exemplary embodiment, a variable focal length lens system is similar to the variable focal length lens system according to the first embodiment or the second embodiment. However, let R5n denote the radius of curvature of the lens surface of a lens included in the negative lens subgroup of the fifth lens group and located closest to the image plane, and let Bf denote the distance between a lens included in the positive lens subgroup of the fifth lens group and located closest to the image plane and the image plane. Then, the variable focal length lens system further satisfies the following conditional expression:

$$0.8 < R5n/Bf < 1.5 \qquad (5)$$

Thus, the performance can be further increased.

The image capturing apparatuses of the present invention can be achieved by the following seventh to eighth exemplary embodiments.

Seventh Exemplary Embodiment

According to the seventh exemplary embodiment, an image capturing apparatus includes a variable focal length lens system and an image pickup device that converts an optical image formed by the variable focal length lens system to an electrical signal. The variable focal length lens system includes a first lens group having a positive refractive power, a second lens group having a negative refractive power, a third lens group having a positive refractive power, and a fourth lens group having a positive refractive power, and a fifth lens group arranged in this order from the object side. When a lens zoom position changes from a wide-angle position at which the focal length is at a minimum to a telephoto position at which the focal length is at a maximum, at least the first to fourth lens groups are movable. The second lens group is moved towards the image-plane side and the third lens group is moved towards the object side so that the distance between the first lens group and the second lens groups is increased and the distance between the second lens group and the third lens groups is decreased. The fourth lens group is moved in the optical axis direction so as to compensate for the change in the position of the image plane due to the movements of the lens groups. The fifth lens group includes a negative subgroup having a negative refractive power and a positive subgroup disposed on the image-plane side of the negative subgroup and having a positive refractive power. In addition, the following conditional expression is satisfied:

$$0.5 < (\beta 2t/\beta 2w)/Z < 0.85 \quad (1)$$

where $\beta 2t$=the lateral magnification of the second lens group at the telephoto position, $\beta 2w$=the lateral magnification of the second lens group at the wide-angle position, and $Z$=a zoom ratio.

Thus, according to the present embodiment, a high-quality image can be captured using a high magnification ratio.

Eighth Exemplary Embodiment

According to an eighth exemplary embodiment, an image capturing apparatus is similar to the image capturing apparatus according to the seventh exemplary embodiment. However, let f5n denote the focal length of the negative subgroup included in the fifth lens group and fw denote the focal length of the whole lens system at the wide-angle position. Then, the following conditional expression is satisfied:

$$2.5 < |f5n|/fw < 5 \quad (2)$$

Thus, the performance of the image capturing apparatus can be further increased.

While the variable focal length lens system and the image capturing apparatus according to the present invention have been described in conjunction with the above-described exemplary embodiments, it will be understood that they are not intended to limit the invention to these embodiments. On the contrary, the invention is intended to cover alternatives, modifications and equivalents, which may be included within the spirit and scope of the invention.

The variable focal length lens system is described in more detail next.

According to the exemplary embodiments of the present invention, the variable focal length lens system includes a first lens group having a positive refractive power, a second lens group having a negative refractive power, a third lens group having a positive refractive power, and a fourth lens group having a positive refractive power, and a fifth lens group arranged in this order from the object side.

When a zoom lens position is changed from a wide-angle position at which the focal length is at a minimum to a telephoto position at which the focal length is at a maximum, at least first to fourth lens groups are movable. The second lens group is moved towards the image-plane side and the third lens group is moved towards the object side so that the distance between the first lens group and the second lens groups is increased and the distance between the second lens group and the third lens group is decreased. The fourth lens group is moved in the optical axis direction so as to compensate for the change in the position of the image plane due to the movements of the lens groups.

In addition, the fifth lens group includes a negative subgroup having a negative refractive power and a positive subgroup disposed on the image-plane side of the negative subgroup and having a positive refractive power. In addition, the following conditional expression is satisfied:

$$0.5 < (\beta 2t/\beta 2w)/Z < 0.85 \quad (1)$$

where $\beta 2t$=the lateral magnification of the second lens group at the telephoto position, $\beta 2w$=the lateral magnification of the second lens group at the wide-angle position, and $Z$=a zoom ratio.

According to the exemplary embodiments of the present invention, by employing the following structure, the variable focal length lens system can provide a high magnification ratio and high performance at the same time. This structure is described in detail next.

According to the exemplary embodiments of the present invention, the variable focal length lens system can provide a high magnification ratio and high performance at the same time by achieving the following two points:

(1) The third lens group is moved towards the object side when a lens zoom position changes from a wide-angle position to a telephoto position; and (2) The fifth lens group includes a negative subgroup having a negative refractive power and a positive subgroup having a positive refractive power.

According to the exemplary embodiments of the present invention, in order for the variable focal length lens system to provide a high magnification ratio and high performance at the same time, the level of responsibility assigned to the second lens group in performing variable magnification is reduced. The term "level of responsibility assigned to the second lens group in performing variable magnification" refers to $\beta 2t/\beta 2w$, which is a ratio of the lateral magnification $\beta 2t$ of the second lens group at the telephoto position to the lateral magnification $\beta 2w$ of the second lens group at the wide-angle position. Here, the ratio $\beta 2t/\beta 2w$ is decreased.

As the ratio $\beta 2t/\beta 2w$ increases, the lateral magnification of the second lens group largely changes when the lens zoom position changes. That is, variations in various aberrations easily occur in accordance with the change in magnification of the variable focal length lens system. In particular, as the magnification ratios become higher, the ratio $\beta 2t/\beta 2w$ becomes higher and the change in the distance between the first lens group and the second lens group becomes larger. Accordingly, the size of the whole lens system increases. For this reason, as the magnification ratio is increased, the refractive power of the second lens group is increased. Thus, it is difficult to provide a high magnification ratio and high performance at the same time.

Therefore, according to the exemplary embodiments of the present invention, when a lens zoom position is changed from a wide-angle position to a telephoto position, the variable focal length lens system actively changes the distance between the second lens group and the third lens group by moving the third lens group towards the object side. That is, the problem is solved by significantly changing the lateral magnification of the third lens group.

When the third lens group is moved towards the object side, the ratio $\beta 3t/\beta 3w$ increases, where $\beta 3w$ denotes a lateral magnification of the third lens group at a wide-angle position and $\beta 3t$ denotes a lateral magnification of the third lens group at a telephoto position. Accordingly, the ratio $\beta 2t/\beta 2w$ can be decreased, and therefore, the negative refractive power of the second lens group can be decreased. In this way, the variations in various aberrations occurring when the lens zoom position is changed can be sufficiently corrected.

When considered from another perspective, in the known zoom lenses, only the third lens group corrects the majority of various aberrations, which is problematic.

However, in the variable focal length lens systems according to the exemplary embodiments of the present invention, since the fifth lens group is disposed on the image plane side of the fourth group, the lens structure of the third lens group can be simplified. Thus, the variable focal length lens systems can provide a high magnification ratio and high performance at the same time.

The structure of the fifth lens group is described next.

In general, an off-axis light ray moves farther off axis towards an end of an optical system (either end on the object side or on the image-plane side).

According to the exemplary embodiments of the present invention, on the basis of this phenomenon, the variable focal length lens systems reduces the load of the third lens group in correcting aberrations by disposing the fifth lens group on the image plane side of the fourth lens group. In particular, when the variable focal length lens systems have the fifth lens group including a negative subgroup having a negative refractive power and a positive subgroup disposed on the image plane side of the negative subgroup and having a positive refractive power, the variable focal length lens systems can reduce the load of the third lens group in correcting aberrations. Thus, the variable focal length lens systems can provide a high magnification ratio and reliable optical quality.

According to the exemplary embodiments of the present invention, the fifth lens group of the variable focal length lens systems has the following two features.

One is a feature for adjusting the position of the exit pupil. The distance between the position of the exit pupil and the image plane can be increased by disposing the negative subgroup having a negative refractive power and a positive subgroup located on the image-plane side of the negative subgroup and having a positive refractive power with an air gap therebetween. That is, a chief ray can reach the image plane with the propagation direction thereof substantially parallel to the optical axis.

The other is a feature for correcting distortion. A negative distortion that tends to occur at the wide-angle position can be sufficiently corrected by directing a strongly concave surface of a lens of the negative subgroup having a negative refractive power towards the image-plane side.

As a result, according to the exemplary embodiments of the present invention, the variable focal length lens systems can increase the range of the position of the exit pupil of a lens system disposed on the object side of the fifth lens group. In particular, an angle between a chief ray exiting the third lens group and the optical axis can be freely determined. In addition, the third lens group need not correct the negative distortion, and therefore, the third lens group can be composed of only a positive subgroup. Consequently, the structure of the third lens group can be simplified.

According to the above-described two features, the variable focal length lens systems can provide a high magnification ratio and high performance at the same time.

According to the exemplary embodiments of the present invention, the variable focal length lens systems need to satisfy the above-described conditional expression (1), namely:

$$0.5<(\beta 2t/\beta 2w)/Z<0.85 \quad (1)$$

Conditional expression (1) defines the range of the change in the lateral magnification ratio of the second lens group when the lens zoom position is changed.

If $(\beta 2t/\beta 2w)/Z$ exceeds the upper limit of conditional expression (1), the change in the lateral magnification ratio of the second lens group is too large when the lens zoom position is changed. Accordingly, the variable focal length lens systems cannot correct the changes in off-axis aberrations caused by the third lens group in accordance with the change in the lens zoom position.

In contrast, if $(\beta 2t/\beta 2w)/Z$ falls below the lower limit of conditional expression (1), the change in the lateral magnification ratio of the third lens group is large when the lens zoom position is changed. Accordingly, the variable focal length lens systems cannot correct the changes in on-axis aberrations caused by the third lens group in accordance with the change in the lens zoom position.

According to the exemplary embodiments of the present invention, to further increase the performance, it is desirable that the variable focal length lens systems satisfy the following conditional expression:

$$2.5<|f5n|/fw<5 \quad (2)$$

where $f5n$=the focal length of the negative subgroup included in the fifth lens group and $fw$=the focal length of the whole zoom lens at the wide-angle position.

Conditional expression (2) defines the range of the focal length of the negative subgroup disposed in the fifth lens group.

Figure 14:
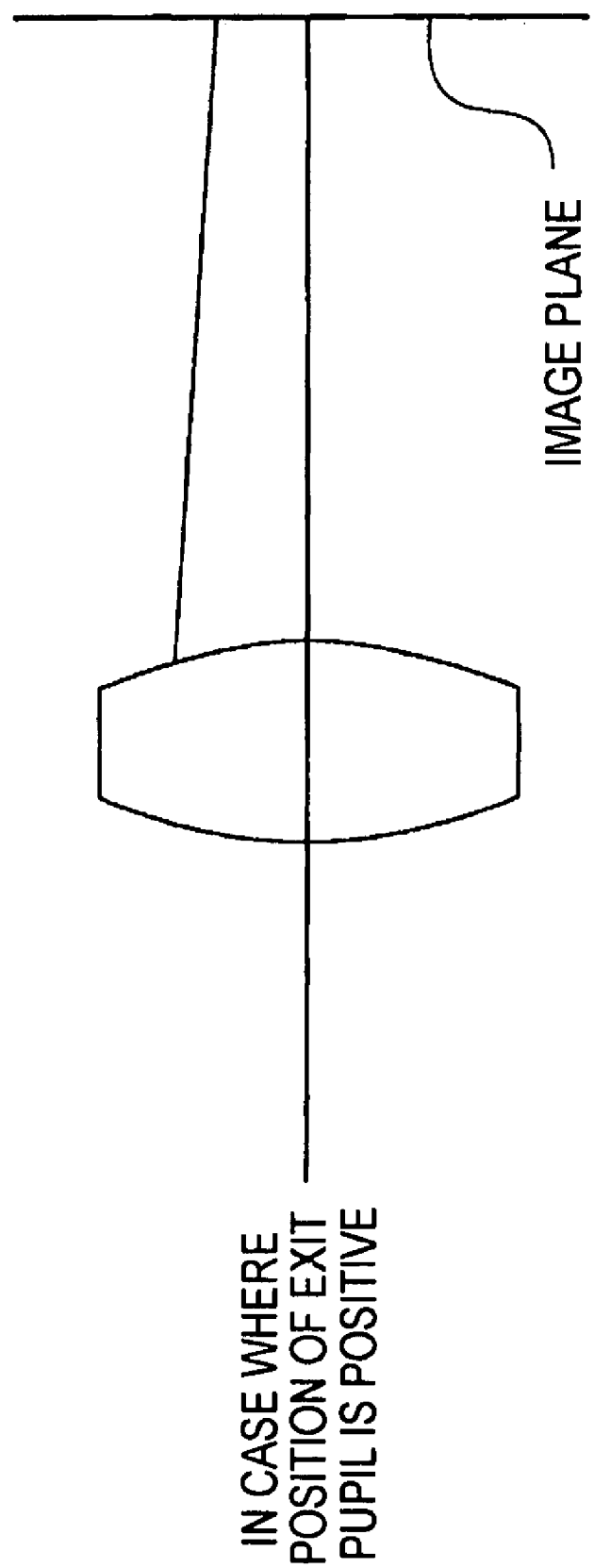
FIG. 14 illustrates a light path diagram illustrating the position of an exit pupil.

If $|f5n|$ exceeds the upper limit of conditional expression (2), it is difficult for the variable focal length lens systems to sufficiently correct negative distortion occurring at the wide-angle position. In contrast, if $|f5n|$ falls below the lower limit of conditional expression (2), light rays are significantly diverged by the negative subgroup. Accordingly, the position of the exit pupil is positive. That is, as shown in FIG. 14, since the chief ray reaching the image plane is close to the optical axis, the off-axis ray passing through the fifth lens group is separated from the optical axis, and therefore, it is difficult for the variable focal length lens systems to sufficiently correct coma aberration occurring at the peripheral portion of a screen.

To further reduce the length of the variable focal length lens systems, it is desirable that the lower limit of conditional expression (2) is 3.

In addition, to reduce the number of movable lens groups and simplify the lens barrel structure of the variable focal length lens systems, it is desirable that the fifth lens group is stationary in the optical axis direction regardless of the lens zoom position.

Furthermore, to achieve a good balance between the reduction in the lens diameter and a high performance, it is desirable that the aperture stop of the variable focal length lens systems is disposed in the vicinity of the third lens group.

In general, as a lens is disposed farther from the aperture stop, an off-axis ray passes through the lens at a position farther from the optical axis. Therefore, it is desirable that the aperture stop is disposed exactly at the center point of the lens system or in the vicinity of the center point. In addition, to sufficiently correct variations in off-axis aberrations occurring when the lens zoom position is changed, the height of the off-axis ray passing through each of the lens groups needs to be significantly changed when the lens zoom position is changed.

In particular, if at least one movable lens group is disposed at both the object side and image plane side of the aperture stop so that the distance between each lens group and the aperture stop is changed, the variation in off-axis aberrations occurring when the lens zoom position is changed can be sufficiently corrected.

In the variable focal length lens systems according to the exemplary embodiments of the present invention, since the aperture stop is disposed in the vicinity of the third lens group, the distance between the optical axis and the off-axis ray passing through the second lens group is decreased when the lens zoom position of the variable focal length lens systems is changed from the wide-angle position to the telephoto position. Thus, the height of the off-axis ray passing through the first and fourth lens groups is changed, and therefore, the performance of the variable focal length lens systems can be improved.

In particular, the variable focal length lens systems according to the exemplary embodiments of the present invention can reduce the diameter of the lens and improve the performance thereof by satisfying the following conditional expression:

$$0.3 < Dsw/TLw < 0.4 \quad (3)$$

where

Dsw=a distance between the aperture stop and the image plane at the wide-angle position and TLw=the total length of the lens system at the wide-angle position.

Conditional expression (3) determines the position of the aperture stop at the wide-angle position.

If the value Dsw/TLw falls below the lower limit of conditional expression (3), the position of the aperture stop at the wide-angle position is changed towards the image plane side. Accordingly, the off-axis ray passing through the first lens group is far from the optical axis, and therefore, the lens diameter cannot be sufficiently reduced.

In contrast, if the value Dsw/TLw exceeds the upper limit of conditional expression (3), the distance between the aperture stop and the second lens group is decreased. Accordingly, the refractive power of the second lens group is too strong. As a result, it is difficult to sufficiently correct the variation in coma aberration caused by the change in the angle of field, and therefore, the performance cannot be sufficiently improved.

In the variable focal length lens systems according to the exemplary embodiments of the present invention, the aperture stop is moved together with the third lens group. Thus, the structure of the lens barrel can be simplified.

In addition, to achieve high optical performance and the reduction in the lens diameter, it is desirable that the fourth lens group is moved in the optical axis direction when focusing on an object a very short distance from the variable focal length lens system.

When the second lens group is moved to focus on an object a very short distance from the variable focal length lens system, the lateral magnification of the second lens group should be in the range between −1 and 0 regardless of the lens zoom position. This is because the variable focal length lens system cannot focus on an object a very short distance from the variable focal length lens system at a lens zoom position at which the lateral magnification of the second lens group is −1 and, if the lateral magnification of the second lens group is less than −1, the moving direction is reversed.

Therefore, as the zoom ratio is higher, the lateral magnification of the second lens group at a wide-angle position is closer to zero. That is, since the refractive power of the second lens group is increased, it is difficult to sufficiently correct the variation of the off-axis aberrations caused by the change in the angle of field at the wide-angle position.

However, the variable focal length lens systems according to the exemplary embodiments of the present invention move the fourth lens group when focusing on an object a very short distance from the variable focal length lens system. Thus, the constraint imposed on the lateral magnification of the second lens group is removed. The lateral magnification of the second lens group ranges between −1 and 0 at the wide-angle position and is less than or equal to −1 at the telephoto position. Thus, the position at which the image is life-size (i.e., the magnification is −1) is present between the wide-angle position and the telephoto position.

As a result, in order to maintain the position of the image plane for an object at infinity constant, the moving direction of the fourth lens group at the wide-angle position is opposite that at the telephoto position. Therefore, at the telephoto position, the distance between the third lens group and the fourth lens group is increased.

When focusing on an object a very short distance from the variable focal length lens system is performed using the fourth lens group, the moving distance of the fourth lens group at the telephoto position is significantly greater than that at the wide-angle position. Accordingly, by maintaining a large distance between the third lens group and the fourth lens group at the telephoto position, the use efficiency of space can be increased when focusing on an object a very short distance from the variable focal length lens system at the telephoto position. In addition, since the moving range of the fourth lens group (i.e., the range required for compensating for the change in the lens zoom position and the change in the position of the object) can be decreased, a drive mechanism of the fourth lens group can be simplified.

To further increase the performance of the variable focal length lens systems according to the exemplary embodiments of the present invention, it is desirable that the variable focal length lens systems satisfy the following conditional expression:

$$0.25 < 1/\beta t < 0.45 \quad (4)$$

Conditional expression (4) determines the lateral magnification of the second lens group at the telephoto position.

If a value of $1/|\beta p2t|$ falls below the lower limit of conditional expression (4), the positive refractive power of the first lens group is increased. Accordingly, the off-axis ray passing through the first lens group is separated from the optical axis at the telephoto position, and therefore, significant coma aberration occurs at the peripheral portion of a screen. For this reason, it is difficult to further improve the performance of the variable focal length lens systems.

In contrast, if the value of $1/|p2t|$ exceeds the upper limit of conditional expression (4), the variation in coma aberration caused by the change in the angle of field is large at the wide-angle position. For this reason, it is difficult to further improve the performance of the variable focal length lens systems.

For the variable focal length lens systems according to the exemplary embodiments of the present invention, in order to reduce the diameter of the lenses of the first lens group, it is desirable that the lower limit of conditional expression (4) is 0.31.

For the variable focal length lens systems according to the exemplary embodiments of the present invention, in order to further improve the performance, it is desirable that the following conditional expression is satisfied:

$$0.8 < R5n/Bf < 1.5 \quad (5)$$

where

R5n=the radius of curvature of the lens surface of a lens included in the negative lens subgroup of the fifth lens group and located closest to the image plane, and Bf=the distance between a lens included in the positive lens subgroup of the fifth lens group, and located closest to the image plane, and the image plane.

Conditional expression (5) determines the radius of curvature of the lens surface of a lens included in the negative lens subgroup of the fifth lens group and located closest to the image plane.

If a value of R5n/Bf falls below the lower limit of conditional expression (5), the performance significantly deteriorates since the negative subgroup and the positive subgroup become eccentric. In contrast, if the value of R5n/Bf exceeds the upper limit of conditional expression (5), it is difficult to effectively correct the negative distortion occurring at the wide-angle position. This is because, as the principal point of the negative subgroup is closer to the image plane, the effect of correcting the distortion is stronger. However, if the value of R5n/Bf exceeds the upper limit, the principal point of the negative subgroup is far from the image plane, and therefore, the effect of correcting the distortion is decreased.

To further improve the performance of the variable focal length lens systems according to the exemplary embodiments of the present invention, it is desirable that the first lens group includes the following three lenses: a negative lens and a positive lens that form a cemented lens and a positive lens arranged in this order from the object side to the image plane side.

Since an off-axis ray having a large diameter is incident on the first lens group, in particular, at a telephoto position, a negative spherical aberration tends to occur. In addition, since the off-axis ray that is distant from the optical axis is incident on the first lens group, an off-axis aberration tends to occur.

In the variable focal length lens systems according to the exemplary embodiments of the present invention, since the cemented lens composed of a negative lens and a positive lens is disposed at a position closest to the object in the first lens group, the negative spherical aberration and axial chromatic aberration can be sufficiently corrected. The positive lens disposed on the image plane side in the cemented lens can primarily and sufficiently correct the variation in coma aberration caused by the change in the angle of field. In this way, by clearly defining the function of each of the lenses, a high optical performance can be realized.

For the variable focal length lens systems according to the exemplary embodiments of the present invention, in order to sufficiently correct various aberrations occurring in the second lens group and provide a high optical performance, it is desirable that the second lens group is composed of the following three lenses: a negative meniscus lens having a concave surface on the image plane side, a negative lens, and a positive lens arranged in this order from the object side.

Since the second lens group is responsible for a variable magnification, it is important that various aberrations occurring in the second lens group are sufficiently corrected in order to improve the performance. In the variable focal length lens systems according to the exemplary embodiments of the present invention, the negative meniscus lens having a concave surface on the image plane side and disposed closest to the object in the second lens group sufficiently corrects the variation in coma aberration caused by the change in the angle of field at the wide-angle position. In addition, a doublet lens disposed on the image plane side of the negative meniscus lens sufficiently corrects the axial aberration. Accordingly, the function of each lens in terms of aberration correction is clearly defined, and therefore, an excellent image-forming performance can be provided.

For the variable focal length lens systems according to the exemplary embodiments of the present invention, in order to sufficiently correct the variations in various aberrations caused by the change in the position of the object, it is desirable that the fourth lens group is composed of a positive lens having a convex surface on the object side and a negative lens having a concave surface on the image plane side arranged in this order from the object side.

The fourth lens group having a doublet structure can correct off-axis aberrations and axial aberrations at the same time, and therefore, the variations in various aberrations occurring when the lens zoom position changes can be sufficiently corrected.

For the variable focal length lens systems according to the exemplary embodiments of the present invention, in order to sufficiently reduce the occurrence of chromatic aberrations, it is desirable that the first lens group is formed of a lens material having highly extraordinary dispersion characteristics.

In particular, when the positive lens of the cemented lens in the first lens group has highly extraordinary dispersion characteristics, second-order dispersion occurring in the central portion of screen at the telephoto position can be sufficiently corrected.

For the variable focal length lens systems according to the exemplary embodiments of the present invention, when an aspheric lens is used, the optical performance can be further improved. In particular, when the fifth lens group includes an aspheric lens, the optical performance in the central portion of a screen can be further improved. In addition, when the second lens group includes an aspheric lens, the variation in coma aberration due to the angle of field at the wide-angle position can be sufficiently corrected.

Furthermore, if a plurality of aspherical surfaces are employed, the optical performance can be further improved.

Still furthermore, a low-pass filter may be disposed to prevent the occurrence of moire fringes on the image plane side of the lens system. In addition, an infrared-cut filter may be disposed in accordance with a spectral sensitivity characteristic of the light receiving element.

The above-described exemplary embodiments and numerical embodiments in which specific numbers are applied to these exemplary embodiments are described next with reference to FIGS. 1 to 13 and Tables 1 to 12.

The aspherical surfaces employed in the numerical embodiments are defined using the following equation:

$$x=cy^2/(1+(1-(1+\kappa)c^2y^2)^{1/2})+Ay^4+By^6+$$

where y denotes the height from the optical axis, x denotes the sag of the surface, c denotes the radius of curvature, κ denotes the conic constant, and A, B, ... denote asperical coefficients.

FIG. 1 illustrates the allocation of refractive powers in the variable focal length lens systems according to the exemplary embodiments of the present invention. Each of the variable focal length lens systems includes a first lens group G1 having a positive refractive power, a second lens group G2 having a negative refractive power, a third lens group G3 having a positive refractive power, a fourth lens group G4 having a positive refractive power, and a fifth lens group G5 having a positive refractive power arranged in this order from the object side to the image plane side. When a variable magnification is performed (the lens zoom position is changed), the first to fourth lens groups are moved so that the air gap between the first lens group G1 and the second lens group G2 increases and the air gap between the second lens group G2 and the third lens group G3 decreases. At that time, the first lens group G1 is temporarily moved towards the image plane side, and subsequently, is moved towards the object side. The second lens group G2 is moved towards the image plane side. The third lens group G3 is moved towards the object side. The fifth lens group G5 is stationary. The fourth lens group G4 is moved so as to compensate for the change in the position of the image plane due to the movement of each lens group. In addition, the fourth lens group G4 is moved towards the object side when focusing on an object a very short distance from the variable focal length lens system.

Figure 2:
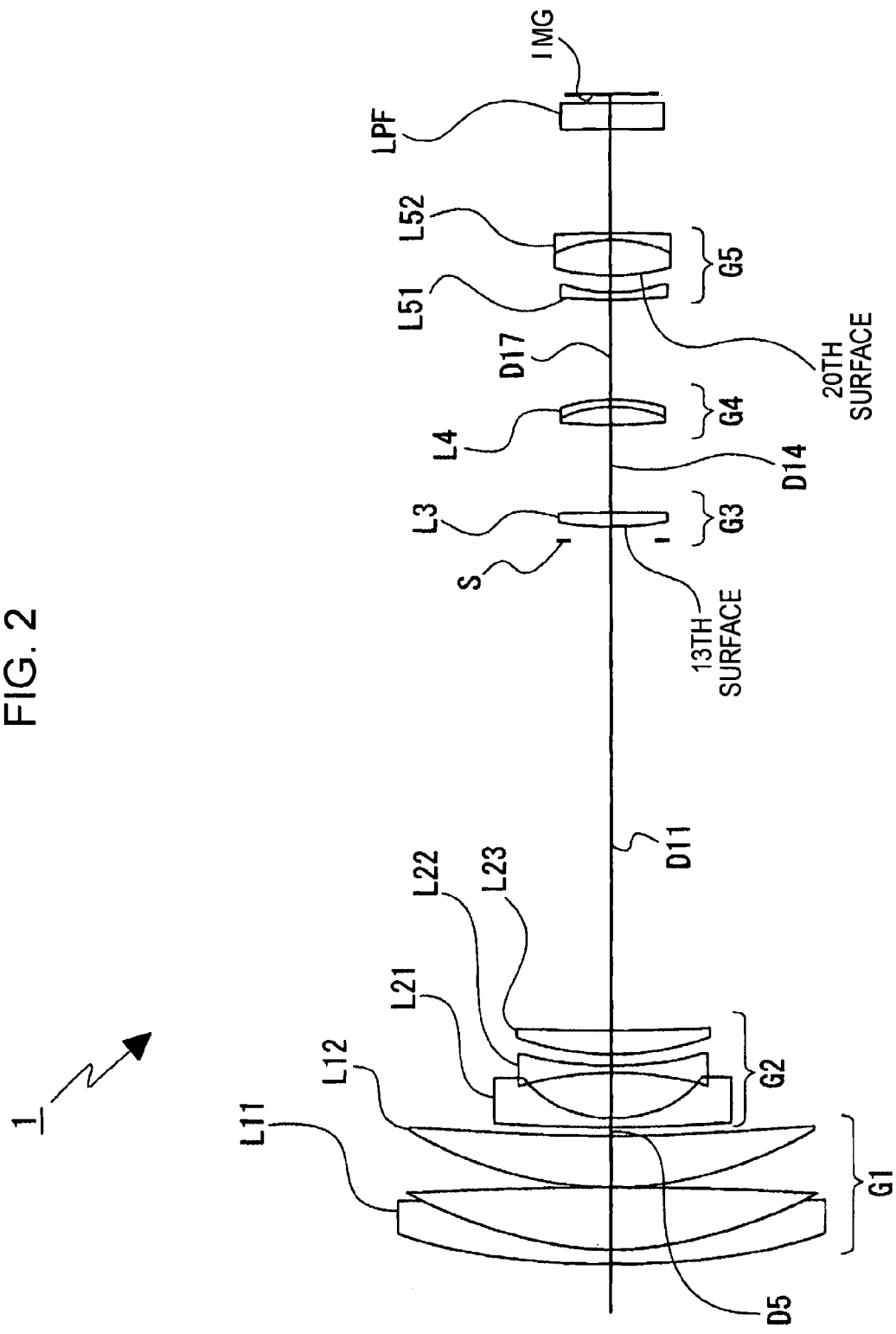
FIG. 2 illustrates an exemplary lens structure of a variable focal length lens system according to a first exemplary embodiment of the present invention.

FIG. 2 illustrates a lens structure of the variable focal length lens system according to the first exemplary embodiment of the present invention. The first lens group G1 includes a cemented lens L11 composed of a negative meniscus lens having a convex surface on the object side and a positive lens having a convex surface on the object side and a positive lens L12 having a convex surface on the object side. The second lens group G2 includes a negative meniscus lens L21 having a concave surface on the image plane side, a negative lens L22 having two concave surfaces, and a positive meniscus lens L23 having a convex surface on the object side. The third lens group G3 includes a positive meniscus lens L3 having an aspherical convex surface on the object side. The fourth lens group G4 includes a cemented lens L4 composed of a positive lens having two convex surfaces and a negative meniscus lens having a concave surface on the object side. The fifth lens group G5 includes a negative meniscus lens L51 having a concave surface on the image plane side and a cemented lens L52 composed of a positive lens having two convex surfaces, one of which on the object side is aspherical, and a negative meniscus lens having a concave surface on the object side.

In addition, in the fifth lens group G5, the negative meniscus lens L51 forms a negative subgroup whereas the cemented lens L52 forms a positive subgroup. An aperture stop S is disposed close to the object side of the third lens group G3. When variable magnification is performed, the aperture stop S is moved together with the third lens group G3. In addition, a low-pass filter LPF is disposed between the fifth lens group G5 and an image plane IMG.

Table 1 is a specification sheet of a first numerical embodiment in which specific values are applied to the first exemplary embodiment. In the following specification sheets including Table 1, the term "surface number" refers to the ith surface from the object side. The term "radius of curvature" refers to the axial radius of curvature of the surface. The term "surface-surface distance" refers to a distance between the ith surface and the (i+1)th surface on an optical axis. The term "index of refraction" refers to the index of refraction of the surface for the d-line ($\lambda$=587.6 nm). The term "Abbe number" refers to the Abbe number of the surface for the d-line. The symbol "f" denotes the focal length. The symbol "FNO" denotes the F number. The symbol "2$\omega$" denotes the angle of field. In addition, the term "surface of a radius of curvature of 0" refers to a flat surface.

TABLE 1 f 1.00~3.01~14.10
FNO 2.86~3.77~4.03
2$\omega$ 73.37~8.89~6.22°

| Surface number | Radius of curvature | Surface-surface distance | Index of refraction | Abbe number |
|---|---|---|---|---|
| 1: | 12.3535 | 0.272 | 1.90366 | 31.1 |
| 2: | 6.6271 | 0.956 | 1.49700 | 81.6 |
| 3: | −68.6237 | 0.038 | | |
| 4: | 6.2777 | 0.798 | 1.60300 | 65.5 |
| 5: | 33.5232 | (D5) | | |
| 6: | 33.5232 | 0.113 | 1.88300 | 40.8 |
| 7: | 1.9369 | 0.744 | | |
| 8: | −5.5880 | 0.131 | 1.75500 | 52.3 |
| 9: | 5.9909 | 0.188 | | |
| 10: | 4.3925 | 0.349 | 1.94596 | 18.0 |
| 11: | 27.3383 | (D11) | | |
| 12: | 0.0000 | 0.225 | (Aperture Stop) | |
| 13: | 4.5071 | 0.197 | 1.58313 | 59.5 |
| 14: | 79.4707 | (D14) | | |
| 15: | 25.1784 | 0.280 | 1.69680 | 55.3 |
| 16: | −1.9802 | 0.075 | 1.75520 | 27.5 |
| 17: | −4.1042 | (D17) | | |
| 18: | 23.4952 | 0.094 | 1.88300 | 40.8 |
| 19: | 2.8167 | 0.282 | | |
| 20: | 3.0357 | 0.563 | 1.82080 | 42.7 |
| 21: | −2.1723 | 0.094 | 1.76182 | 26.6 |
| 22: | −16.5286 | 1.668 | | |
| 23: | 0.0000 | 0.391 | 1.51680 | 64.2 |
| 24: | 0.0000 | (Bf) | | |

According to the first exemplary embodiment, the 13th surface and the 20th surface are aspherical. Accordingly, the fourth-order aspherical coefficients A, the sixth-order aspherical coefficients B, the eighth-order aspherical coefficients C, the tenth-order aspherical coefficients D, and the conic constants $\kappa$ of the 13th and 20th surfaces are shown in Table 2. In Table 2 and the following tables including the aspherical coefficients, the symbol "E-i" represents a decimal exponent, i.e., "$\times 10^{-i}$". For example, "0.26029E-05" represents "$0.26029 \times 10^{-5}$".

TABLE 2

| 13th Surface | $\kappa$ = 0.00000 | A = −0.822452E−02 | B = +0.406029E−03 | C = 0.755149E−03 |
| | D = −0.170743E−02 | | | |
| 20th Surface | $\kappa$ = 0.00000 | A = −0.414312E−02 | B = −0.411830E−02 | C = +0.343414E−02 |
| | D = −0.100723E−02 | | | |

In the first exemplary embodiment, when the lens zoom position is changed from the wide-angle position to the telephoto position, a surface-surface distance D5 between the first lens group G1 and the second lens group G2, a surface-surface distance D11 between the second lens group G2 and the aperture stop S, a surface-surface distance D14 between the third lens group G3 and the fourth lens group G4, and a surface-surface distance D17 between the fourth lens group G4 and the fifth lens group G5 are changed. Table 3 shows these surface-surface distances and a back focus Bf at the wide-angle position (f=1.000), the middle focal length position (f=3 (Variable-distance Table) photo position (f=14.100) according to the first numerical embodiment.

TABLE 3

(Variable-distance Table)

| | f | | |
|---|---|---|---|
| | 1.000 | 3.014 | 14.100 |
| D5 | 0.169 | 3.172 | 6.610 |
| D11 | 7.929 | 3.619 | 0.488 |
| D14 | 1.440 | 0.901 | 1.789 |
| D17 | 1.635 | 2.765 | 2.051 |
| Bf | 0.150 | 0.150 | 0.150 |

Table 4 shows values corresponding to the above-described conditional expressions (1) to (5) according to the first numerical embodiment.

TABLE 4

Figure 3:
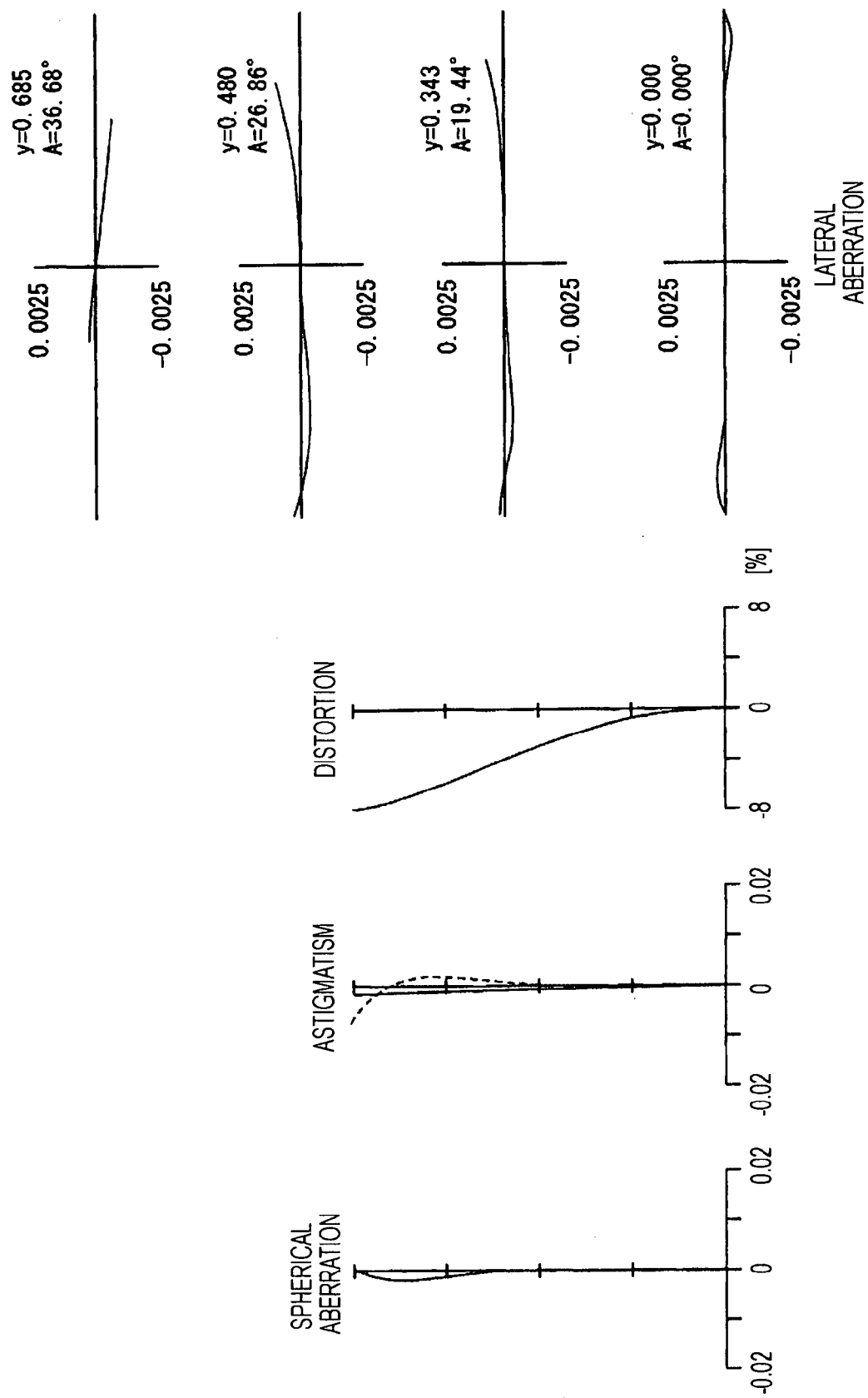
FIG. 3 illustrates aberration graphs (spherical aberration, astigmatism, distortion, and lateral aberration at a wide-angle position) according to a first numerical embodiment in which specific values are applied to the variable focal length lens system according to the first exemplary embodiment.
Figure 4:
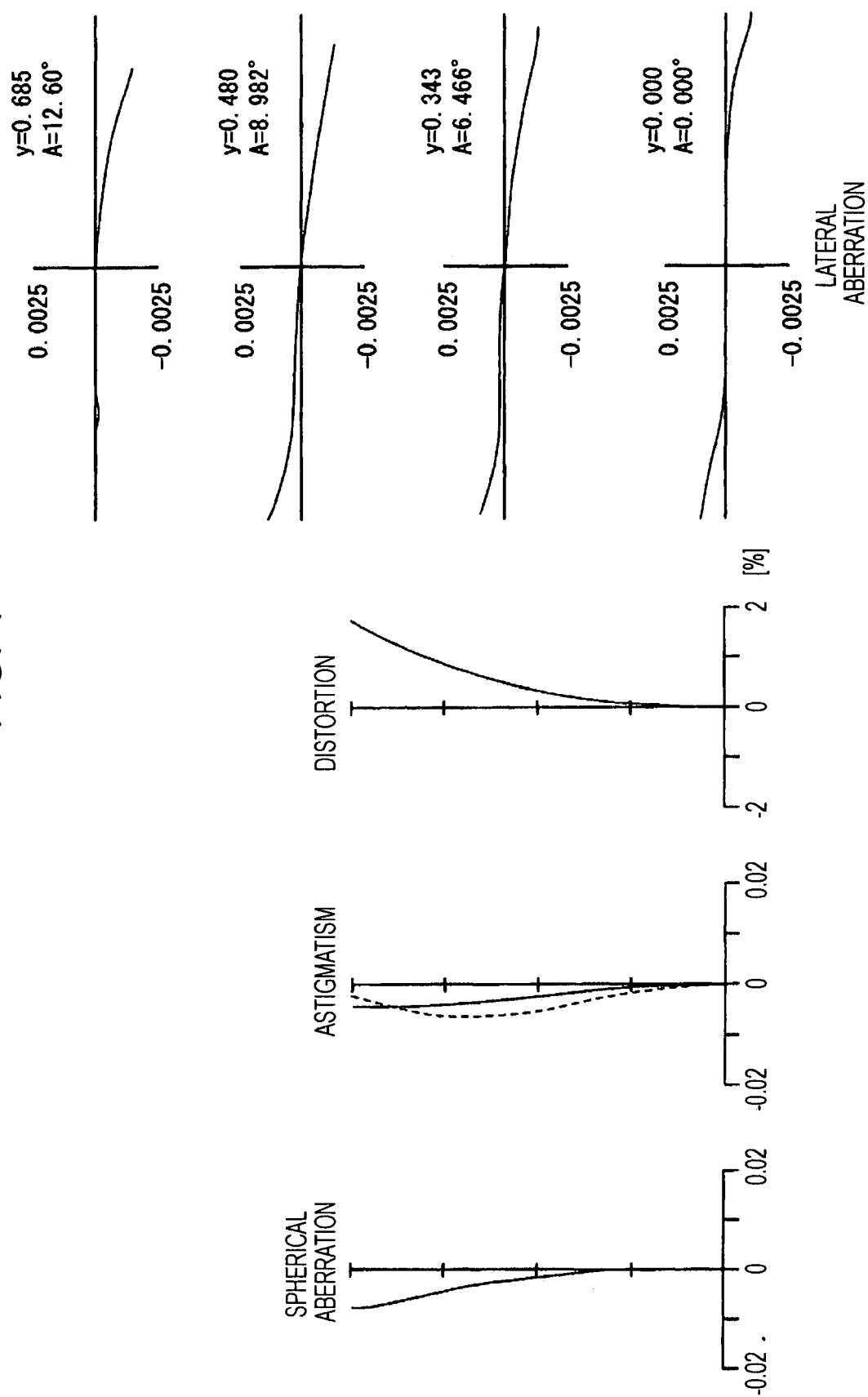
FIG. 4 illustrates a spherical aberration graph, an astigmatism graph, a distortion graph, and a lateral aberration graph at a middle focal position according to the first numerical embodiment.
Figure 5:
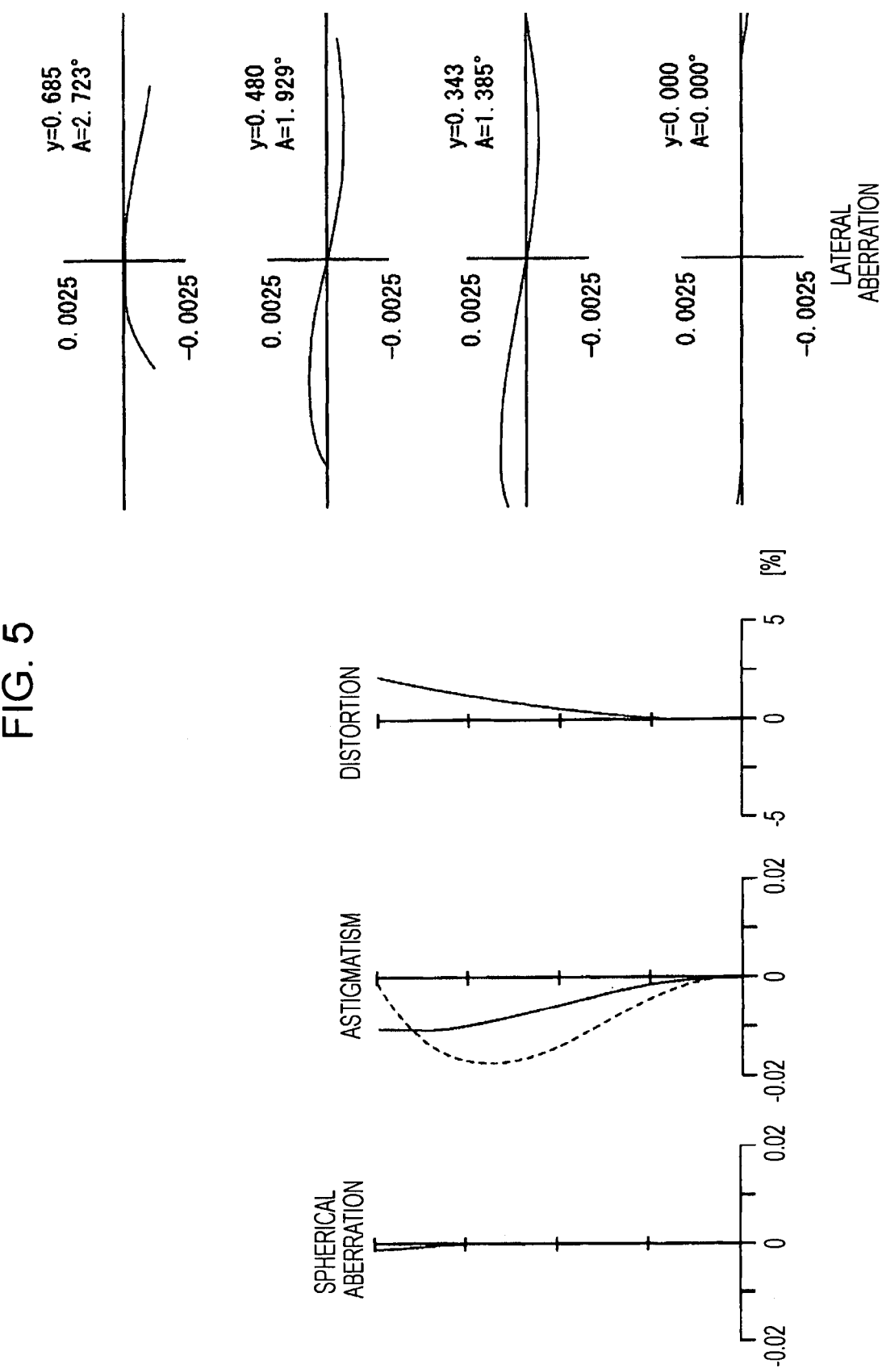
FIG. 5 illustrates a spherical aberration graph, an astigmatism graph, a distortion graph, and a lateral aberration graph at a telephoto position according to the first numerical embodiment.

$\beta 2t = -3.055$
$\beta 2w = -0.278$
$f5n = -3.632$
(1) $(\beta 2t/\beta 2w)/Z = 0.781$
(2) $|f5n|/fw = 3.632$
(3) $Dsw/TLw = 0.378$
(4) $1/|\beta 2t| = 0.327$
(5) $R5n/Bf = 1.275$ FIGS. 3 to 5 are aberration graphs when the lens system focuses on infinity according to the first numerical embodiment, where FIG. 3 illustrates aberration graphs at the wide-angle position (f=1.000), FIG. 4 illustrates aberration graphs at the middle focal length position (f=3.014), and FIG. 3 illustrates aberration graphs at the telephoto position (f=14.100).

In the aberration graphs shown in FIGS. 3 to 5, a solid line in the spherical aberration graphs indicates the spherical aberration. In the astigmatism graphs, a solid line indicates the sagittal image plane whereas a dotted line indicates the meridional image plane. In the lateral aberration graphs, a symbol "A" indicates the angle of field. A symbol "y" indicates the image height.

As can be seen from these aberration graphs, according to the first numerical embodiment, various aberrations can be sufficiently corrected, and the variable focal length lens system has an excellent image-forming performance.

Figure 6:
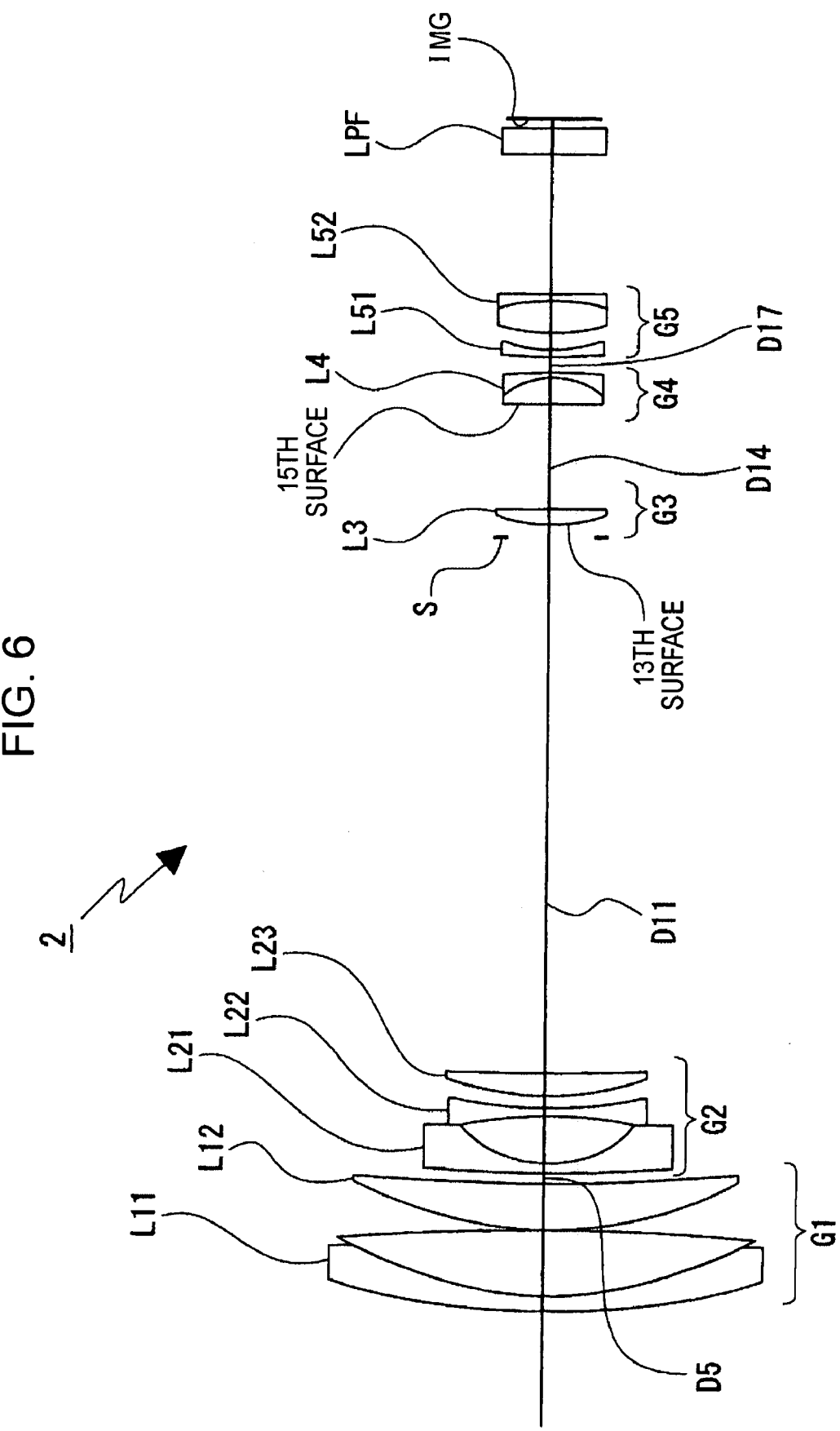
FIG. 6 illustrates an exemplary lens structure of a variable focal length lens system according to a second exemplary embodiment of the present invention.

FIG. 6 illustrates a lens structure of the variable focal length lens system according to the second exemplary embodiment of the present invention. The first lens group G1 includes a cemented lens L11 composed of a negative meniscus lens having a convex surface on the object side and a positive lens having a convex surface on the object side and a positive lens L12 having a convex surface on the object side. The second lens group G2 includes a negative meniscus lens L21 having a concave surface on the image plane side, a negative lens L22 having two concave surfaces, and a positive meniscus lens L23 having a convex surface on the object side. The third lens group G3 includes a positive meniscus lens L3 having an aspherical convex surface on the object side. The fourth lens group G4 includes a cemented lens L4 composed of a positive lens having two convex surfaces, one of which on the object side is aspherical, and a negative meniscus lens having a concave surface on the object side. The fifth lens group G5 includes a negative meniscus lens L51 having a concave surface on the image plane side and a cemented lens L52 composed of a positive lens having two convex surfaces and a negative meniscus lens having a concave surface on the object side.

In addition, in the fifth lens group G5, the negative meniscus lens L51 forms a negative subgroup whereas the cemented lens L52 forms a positive subgroup. An aperture stop S is disposed close to the object side of the third lens group G3. When variable magnification is performed, the aperture stop S is moved together with the third lens group G3. In addition, a low-pass filter LPF is disposed between the fifth lens group G5 and an image plane IMG.

Table 5 is a specification sheet of a second numerical embodiment in which specific values are applied to the second exemplary embodiment.

TABLE 5 f 1.00~3.20~14.10
FNO 2.87~3.61~4.03
2ω 42.89~23.52~5.39°

| Surface number | Radius of curvature | Surface-surface distance | Index of refraction | Abbe number |
|---|---|---|---|---|
| 1: | 14.0861 | 0.270 | 1.90366 | 31.1 |
| 2: | 7.0926 | 0.923 | 1.49700 | 81.6 |
| 3: | -43.0379 | 0.037 | | |
| 4: | 6.6344 | 0.724 | 1.60300 | 65.5 |
| 5: | 40.4514 | (D5) | | |
| 6: | 33.3053 | 0.112 | 1.88300 | 40.8 |
| 7: | 1.8894 | 0.762 | | |
| 8: | -7.1286 | 0.130 | 1.88300 | 40.8 |
| 9: | 7.6737 | 0.186 | | |
| 10: | 4.3547 | 0.373 | 1.94596 | 18.0 |
| 11: | 33.4058 | (D11) | | |
| 12: | 0.0000 | 0.223 | (Aperture Stop) | |
| 13: | 2.7649 | 0.233 | 1.58313 | 59.5 |
| 14: | 27.5363 | (D14) | | |
| 15: | -35.1305 | 0.385 | 1.74330 | 49.2 |
| 16: | -1.2655 | 0.074 | 1.64769 | 33.8 |
| 17: | -7.4522 | (D17) | | |
| 18: | 13.1023 | 0.093 | 1.88300 | 40.8 |
| 19: | 2.7925 | 0.279 | | |
| 20: | 2.8183 | 0.506 | 1.80420 | 46.5 |
| 21: | -2.7342 | 0.093 | 1.90366 | 31.1 |
| 22: | -41.2661 | 2.196 | | |
| 23: | 0.0000 | 0.388 | 1.51680 | 64.2 |
| 24: | 0.0000 | (Bf) | | |

According to the second exemplary embodiment, the 13th surface and the 15th surface are aspherical. Accordingly, the fourth-order aspherical coefficients A, the sixth-order aspherical coefficients B, the eighth-order aspherical coefficients C, the tenth-order aspherical coefficients D, and the conic constants κ of the 13th and 15th surfaces are shown in Table 6.

TABLE 6

| 13th Surface | κ = 0.000000 | A = -0.663762E-02 | B = +0.309178E-02 | C = -0.800163E-02 |
| | D = +0.553125E-02 | | | |
| 15th Surface | κ = 0.000000 | A = -0.142867E-01 | B = -0.522241E-02 | C = +0.511481E-02 |
| | D = -0.423492E-02 | | | |

In the second exemplary embodiment, when the lens zoom position is changed from the wide-angle position to the telephoto position, a surface-surface distance D5 between the first lens group G1 and the second lens group G2, a surface-surface distance D11 between the second lens group G2 and the aperture stop S, a surface-surface distance D14 between the third lens group G3 and the fourth lens group G4, and a surface-surface distance D17 between the fourth lens group G4 and the fifth lens group G5 are changed. Table 7 shows these surface-surface distances and a back focus Bf at the wide-angle position (f=1.000), the middle focal length position (f=(Variable-distanceTable) ephoto position (f=14.097) according to the second numerical embodiment.

TABLE 7

(Variable-distance Table)

| | f | | |
|---|---|---|---|
| | 1.000 | 3.197 | 14.097 |
| D5 | 0.168 | 3.455 | 6.786 |
| D11 | 8.395 | 3.490 | 0.484 |
| D14 | 1.641 | 1.407 | 2.514 |
| D17 | 0.279 | 1.360 | 0.699 |
| Bf | 0.149 | 0.149 | 0.149 |

Table 8 shows values corresponding to the above-described conditional expressions (1) to (5) according to the second numerical embodiment.

TABLE 8

| |
|---|
| β2t = −2.605 |
| β2w = −0.281 |
| f5n = −4.036 |
| (1) (β2t/β2w)/Z = 0.657 |
| (2) \|f5n\|/fw = 4.036 |
| (3) Dsw/TLw = 0.351 |
| (4) 1/\|β2t\| = 0.384 |
| (5) R5n/Bf = 1.022 |

Figure 7:
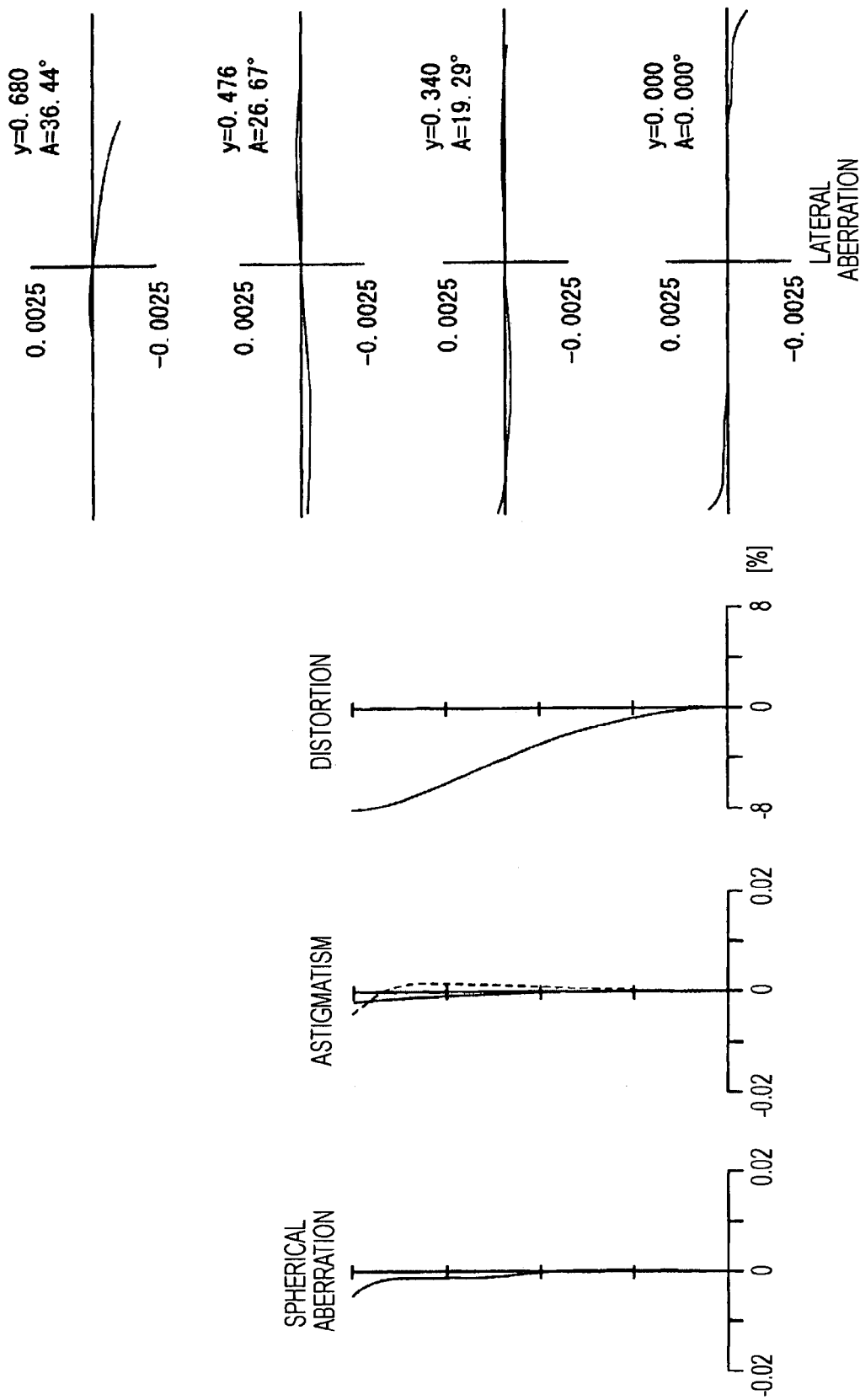
FIG. 7 illustrates aberration graphs (spherical aberration, astigmatism, distortion, and lateral aberration at a wide-angle position) according to a second numerical embodiment in which specific values are applied to the variable focal length lens system according to the second exemplary embodiment.
Figure 8:
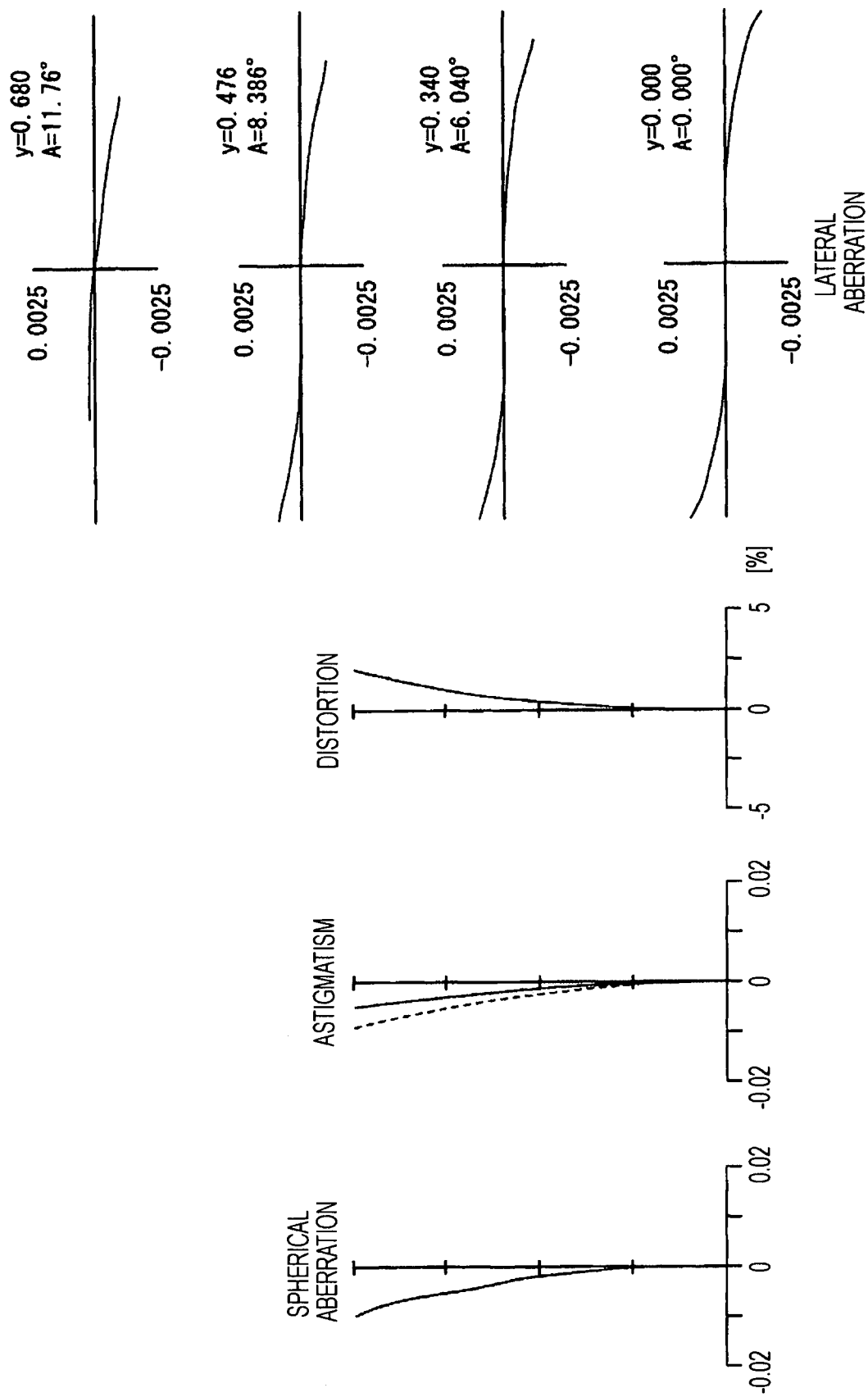
FIG. 8 illustrates a spherical aberration graph, an astigmatism graph, a distortion graph, and a lateral aberration graph at a middle focal position according to the second numerical embodiment.
Figure 9:
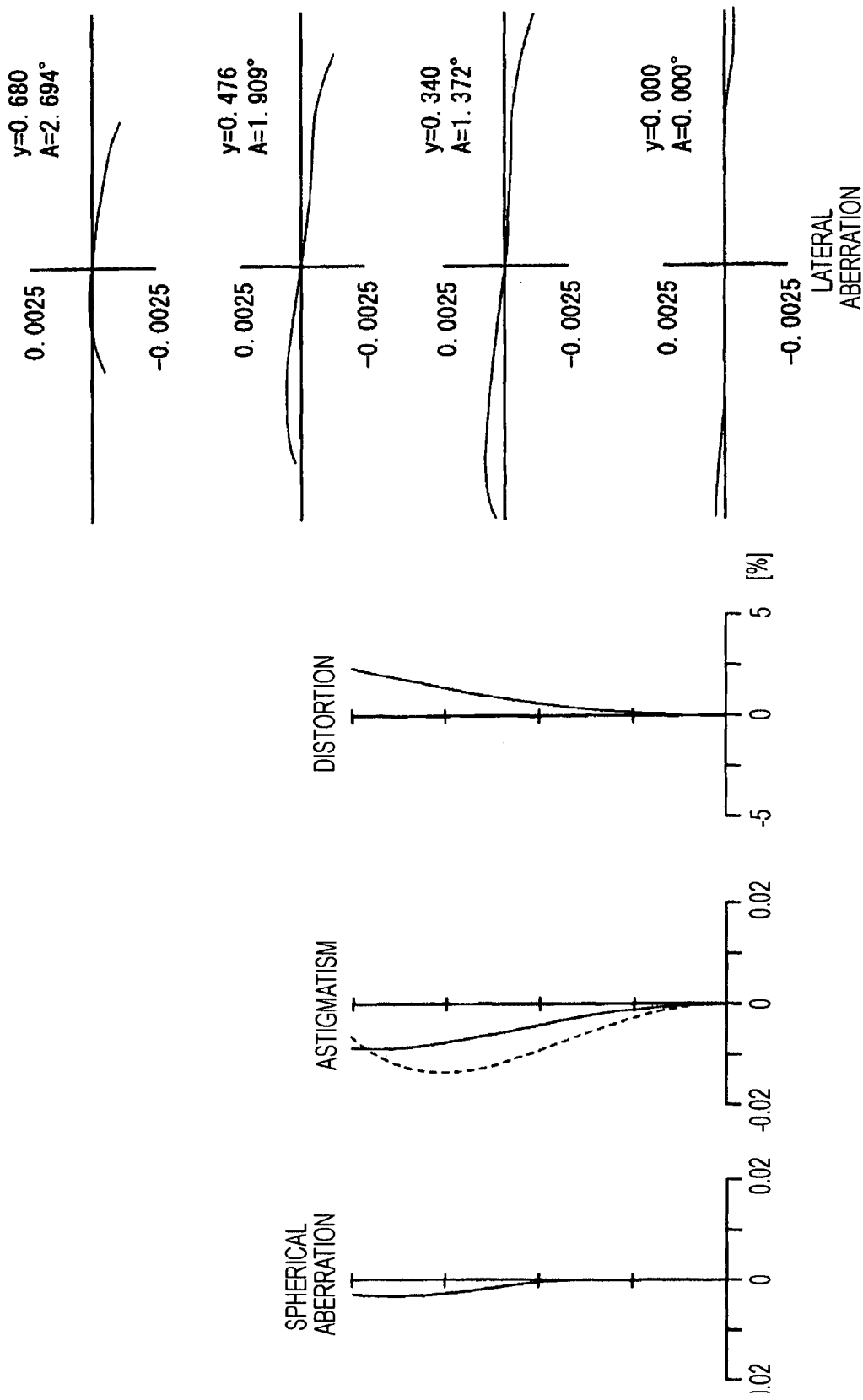
FIG. 9 illustrates a spherical aberration graph, an astigmatism graph, a distortion graph, and a lateral aberration graph at a telephoto position according to the second numerical embodiment.

FIGS. 7 to 9 are aberration graphs when the lens system focuses on infinity according to the second numerical embodiment, where FIG. 7 illustrates aberration graphs at the wide-angle position (f=1.000), FIG. 8 illustrates aberration graphs at the middle focal length position (f=3.197), and FIG. 9 illustrates aberration graphs at the telephoto position (f=14.097).

In the aberration graphs shown in FIGS. 7 to 9, a solid line in the spherical aberration graphs indicates the spherical aberration. In the astigmatism graphs, a solid line indicates the sagittal image plane whereas a dotted line indicates the meridional image plane. In the lateral aberration graphs, a symbol "A" indicates the angle of field. A symbol "y" indicates the image height.

As can be seen from these aberration graphs, according to the second numerical embodiment, various aberrations can be sufficiently corrected, and the variable focal length lens system has an excellent image-forming performance.

Figure 10:
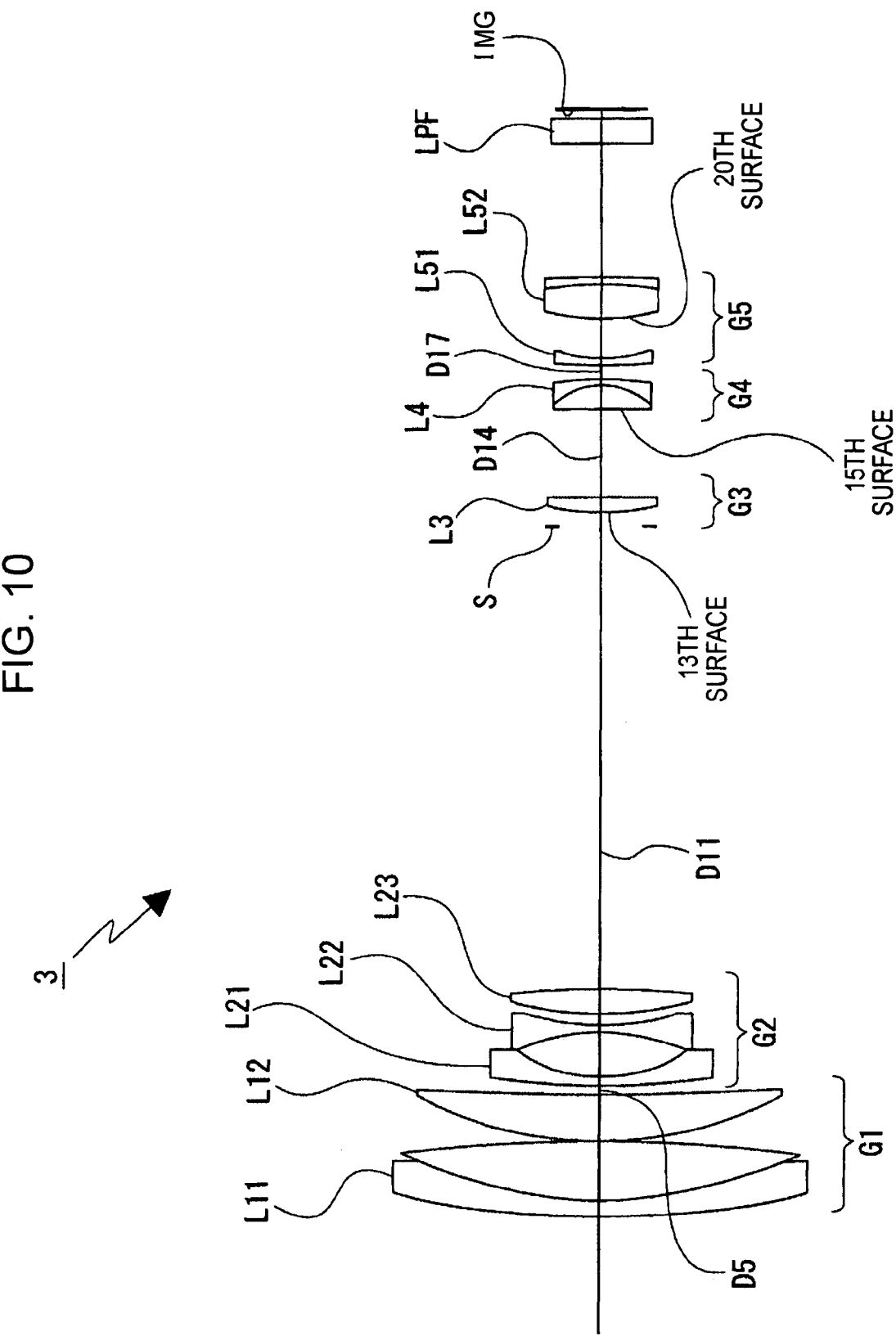
FIG. 10 illustrates an exemplary lens structure of a variable focal length lens system according to a third exemplary embodiment of the present invention.

FIG. 10 illustrates a lens structure of the variable focal length lens system according to the third exemplary embodiment of the present invention. The first lens group G1 includes a cemented lens L11 composed of a negative meniscus lens having a convex surface on the object side and a positive lens having a convex surface on the object side and a positive lens L12 having a convex surface on the object side. The second lens group G2 includes a negative meniscus lens L21 having a concave surface on the image plane side, a negative lens L22 having two concave surfaces, and a lens L23 having two convex surfaces. The third lens group G3 includes a positive lens L3 having two convex surfaces, one of which on the object side is aspherical. The fourth lens group G4 includes a cemented lens L4 composed of a positive meniscus lens having an aspherical surface on the object side and a convex surface on the image plane side. The fifth lens group G5 includes a negative meniscus lens L51 having a convex surface on the object side and a cemented lens L52 composed of a positive lens having two convex surfaces, one of which on the object side is aspherical, and a negative meniscus lens having a concave surface on the object side.

In addition, in the fifth lens group G5, the negative meniscus lens L51 forms a negative subgroup whereas the cemented lens L52 forms a positive subgroup. An aperture stop S is disposed close to the object side of the third lens group G3. When variable magnification is performed, the aperture stop S is moved together with the third lens group G3. In addition, a low-pass filter LPF is disposed between the fifth lens group G5 and an image plane IMG.

Table 9 is a specification sheet of a third numerical embodiment in which specific values are applied to the third exemplary embodiment.

TABLE 9 f 1.00~2.83~14.09
FNO 2.86~3.61~4.03
2ω 70.74~25.34~5.14°

| Surface number | Radius of curvature | Surface-surface distance | Index of refraction | Abbe number |
|---|---|---|---|---|
| 1: | 14.4208 | 0.259 | 1.90366 | 31.1 |
| 2: | 6.9464 | 0.920 | 1.49700 | 81.6 |
| 3: | −24.6900 | 0.036 | | |
| 4: | 6.1830 | 0.682 | 1.60300 | 65.5 |
| 5: | 33.9441 | (D5) | | |
| 6: | 10.8678 | 0.107 | 1.88300 | 40.8 |
| 7: | 2.2431 | 0.713 | | |
| 8: | −3.4366 | 0.125 | 1.88300 | 40.8 |
| 9: | 4.1829 | 0.179 | | |
| 10: | 4.9742 | 0.357 | 1.94596 | 18.0 |
| 11: | −20.1751 | (D11) | | |
| 12: | 0.0000 | 0.215 | (Aperture Stop) | |
| 13: | 2.5469 | 0.234 | 1.58313 | 59.5 |
| 14: | 91.0282 | (D14) | | |
| 15: | −17.1141 | 0.339 | 1.74330 | 49.2 |
| 16: | −1.1790 | 0.072 | 1.64769 | 33.8 |
| 17: | −6.1596 | (D17) | | |
| 18: | 16.2323 | 0.089 | 1.88300 | 40.8 |
| 19: | 2.6823 | 0.617 | | |
| 20: | 2.8870 | 0.536 | 1.69350 | 53.3 |
| 21: | −4.9000 | 0.089 | 1.92286 | 20.9 |
| 22: | −8.7104 | 2.040 | | |
| 23: | 0.0000 | 0.373 | 1.51680 | 64.2 |
| 24: | 0.0000 | (Bf) | | |

According to the third exemplary embodiment, the 13th surface, the 15th surface, and the 20th surface are aspherical. Accordingly, the fourth-order aspherical coefficients A, the sixth-order aspherical coefficients B, the eighth-order aspherical coefficients C, the tenth-order aspherical coefficients D and the conic constants κ of the 13th, 15th, and 20th surfaces are shown in Table 10.

TABLE 10

| | | | | |
|---|---|---|---|---|
| 13th Surface | κ = +0.000000 | A = −0.865064E−02 | B = +0.947240E−03 | C = −0.719388E−02 |
| | D = +0.650244E−02 | | | |
| 15th Surface | κ = +0.000000 | A = −0.185485E−01 | B = −0.925019E−03 | C = −0.471264E−02 |
| | D = +0.233050E−02 | | | |
| 20th Surface | κ = +0.000000 | A = −0.386382E−02 | B = +0.360042E−04 | C = −0.841154E−03 |
| | D = +0.475501E−03 | | | |

In the third exemplary embodiment, when the lens zoom position is changed from the wide-angle position to the telephoto position, a surface-surface distance D5 between the first lens group G1 and the second lens group G2, a surface-surface distance D11 between the second lens group G2 and the aperture stop S, a surface-surface distance D14 between the third lens group G3 and the fourth lens group G4, and a surface-surface distance D17 between the fourth lens group G4 and the fifth lens group G5 are changed. Table 11 shows these surface-surface distances and a back focus Bf at the wide-angle position (f=1.000), the middle focal length position (f=2 (Variable-distance Table) photo position (f=14.093) according to the third numerical embodiment.

TABLE 11

(Variable-distance Table)

| | f | | |
|---|---|---|---|
| | 1.000 | 2.825 | 14.093 |
| D5 | 0.161 | 2.834 | 6.095 |
| D11 | 7.215 | 3.402 | 0.465 |
| D14 | 1.399 | 1.064 | 1.909 |
| D17 | 0.268 | 1.221 | 0.575 |
| Bf | 0.143 | 0.143 | 0.143 |

Table 12 shows values corresponding to the above-described conditional expressions (1) to (5) according to the third numerical embodiment.

TABLE 12

Figure 11:
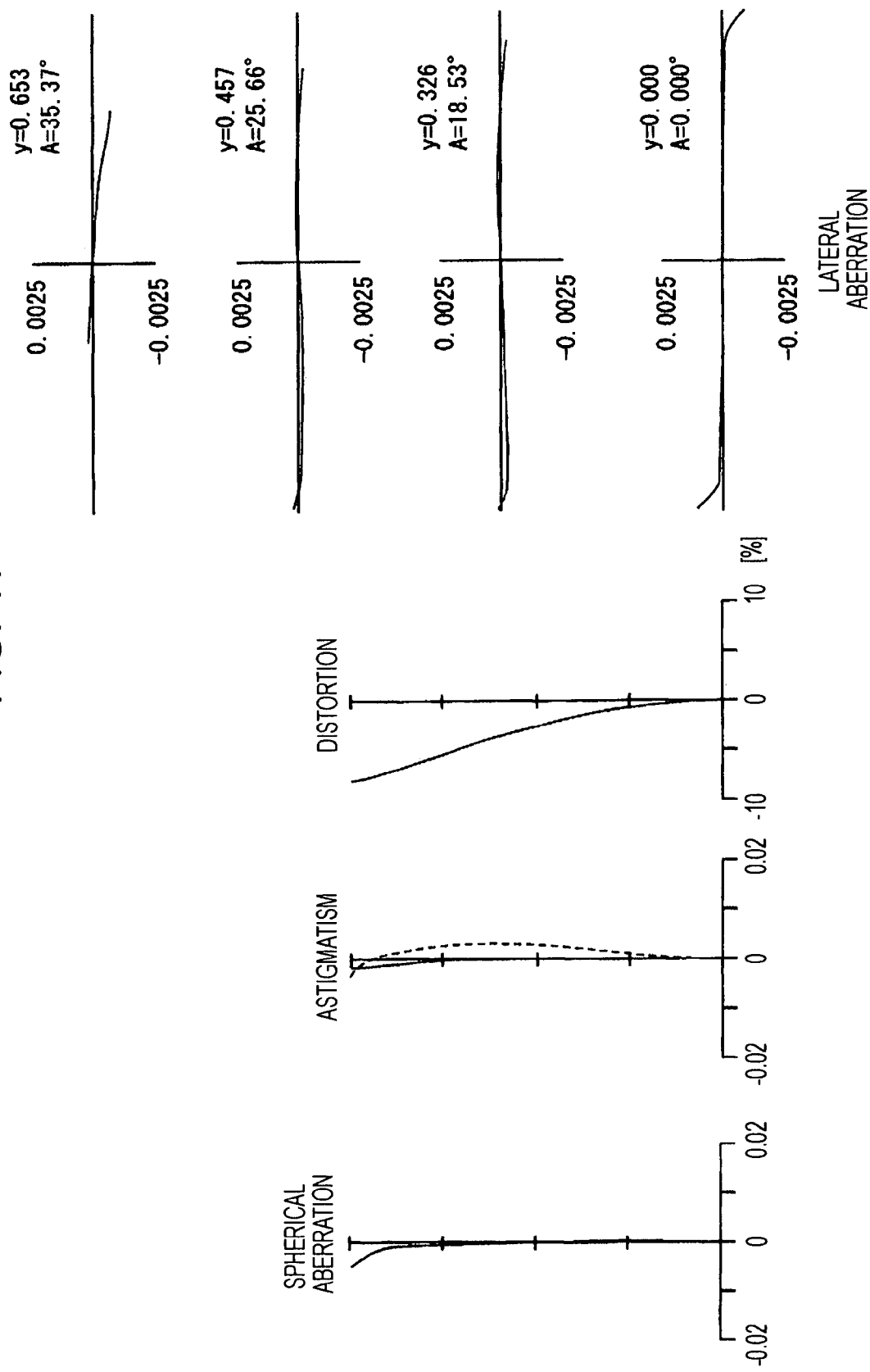
FIG. 11 illustrates aberration graphs (spherical aberration, astigmatism, distortion, and lateral aberration at a wide-angle position) according to a third numerical embodiment in which specific values are applied to the variable focal length lens system according to the third exemplary embodiment.
Figure 12:
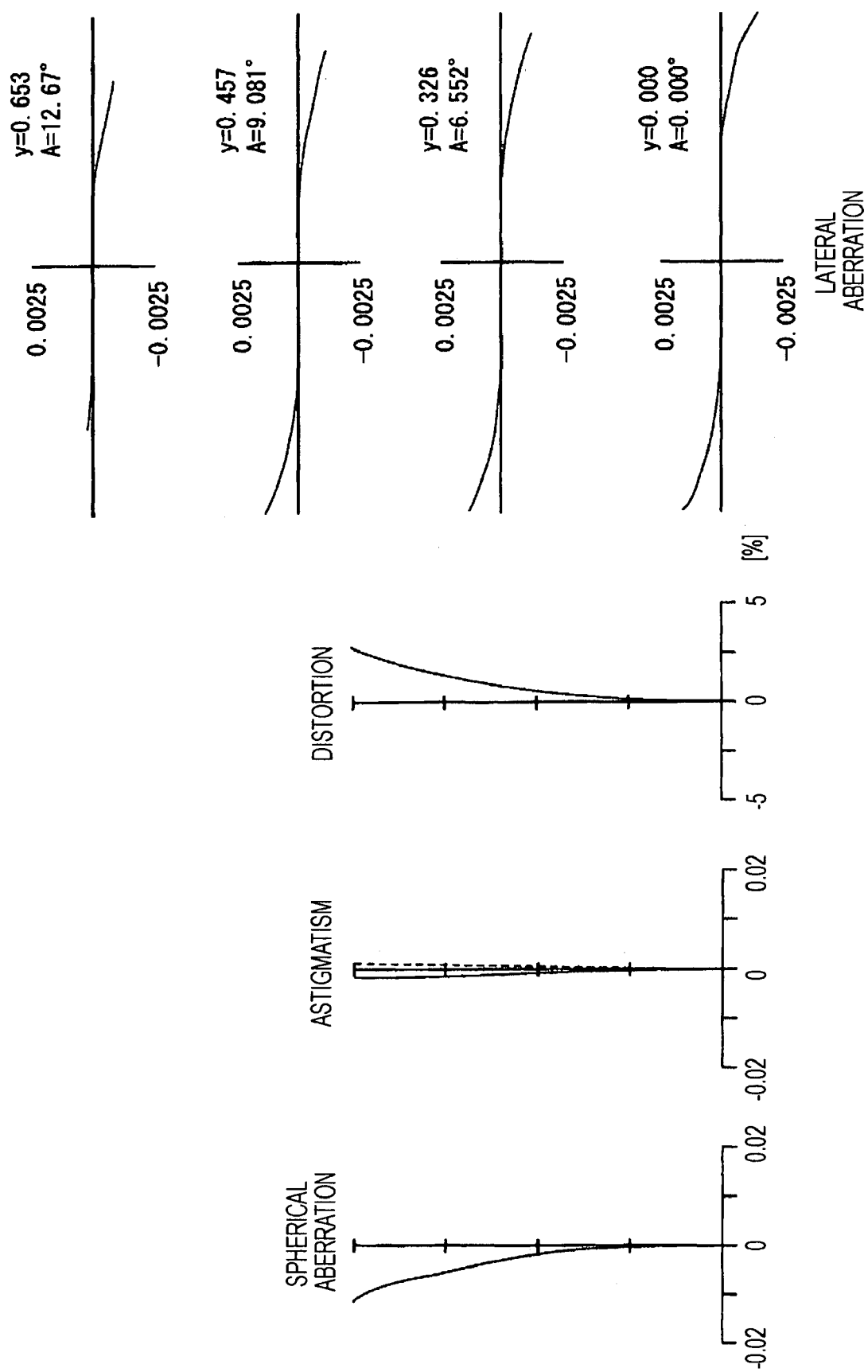
FIG. 12 illustrates a spherical aberration graph, an astigmatism graph, a distortion graph, and a lateral aberration graph at a middle focal position according to the third numerical embodiment.
Figure 13:
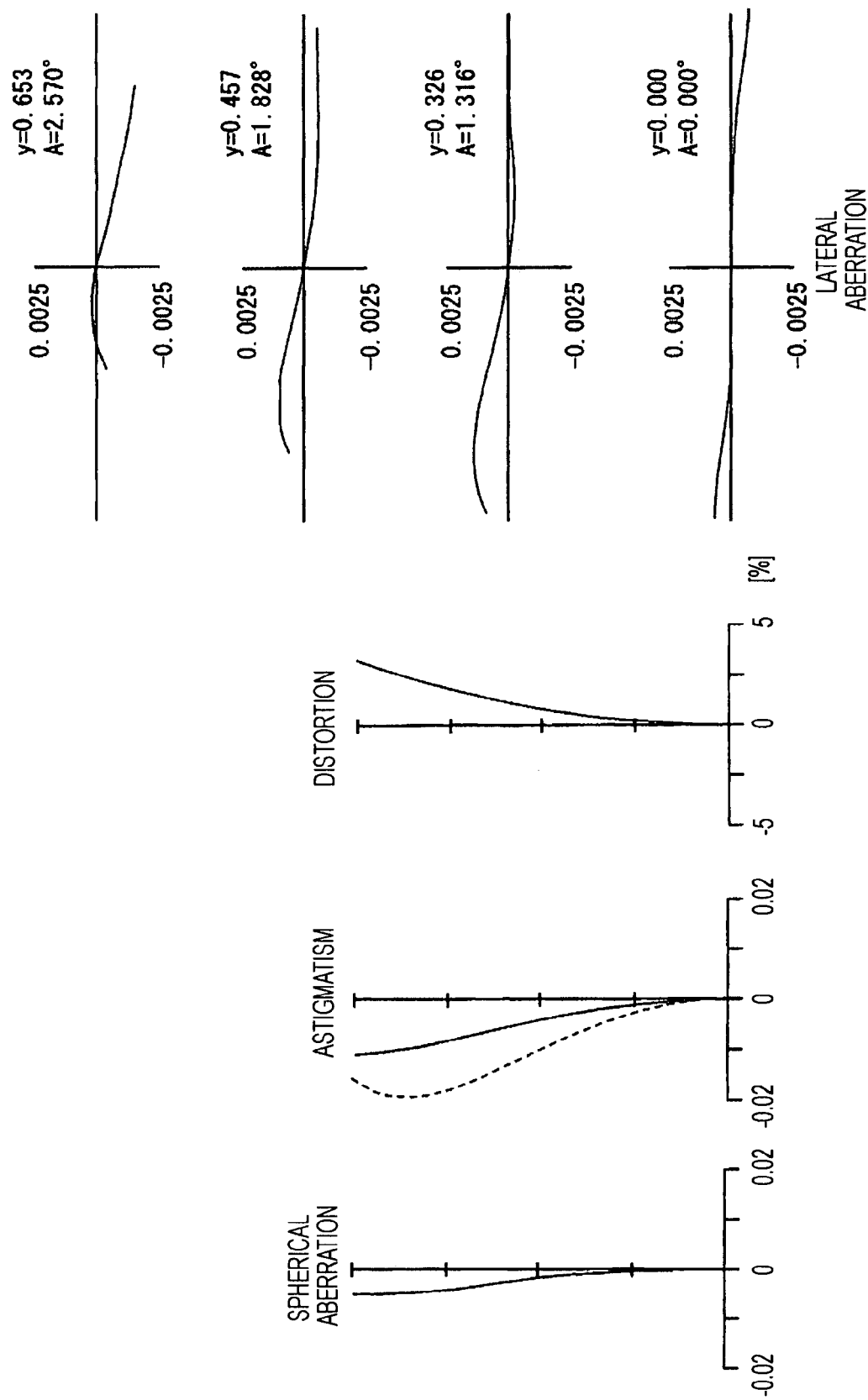
FIG. 13 illustrates a spherical aberration graph, an astigmatism graph, a distortion graph, and a lateral aberration graph at a telephoto position according to the third numerical embodiment.

$\beta 2t = -2.818$
$\beta 2w = -0.277$
$f5n = -3.650$
(1) $(\beta 2t/\beta 2w)/Z = 0.721$
(2) $|f5n|/fw = 3.650$
(3) $Dsw/TLw = 0.374$
(4) $1/|\beta 2t| = 0.355$
(5) $R5n/Bf = 1.049$ FIGS. 11 to 13 are aberration graphs when the lens system focuses on infinity according to the third numerical embodiment, where FIG. 11 illustrates aberration graphs at the wide-angle position (f=1.000), FIG. 12 illustrates aberration graphs at the middle focal length position (f=2.825), and FIG. 13 illustrates aberration graphs at the telephoto position (f=14.093).

In the aberration graphs shown in FIGS. 11 to 13, a solid line in the spherical aberration graphs indicates the spherical aberration. In the astigmatism graphs, a solid line indicates the sagittal image plane whereas a dotted line indicates the meridional image plane. In the lateral aberration graphs, a symbol "A" indicates the angle of field. A symbol "y" indicates the image height.

As can be seen from these aberration graphs, according to the third numerical embodiment, various aberrations can be sufficiently corrected, and the variable focal length lens system has an excellent image-forming performance.

Figure 15:
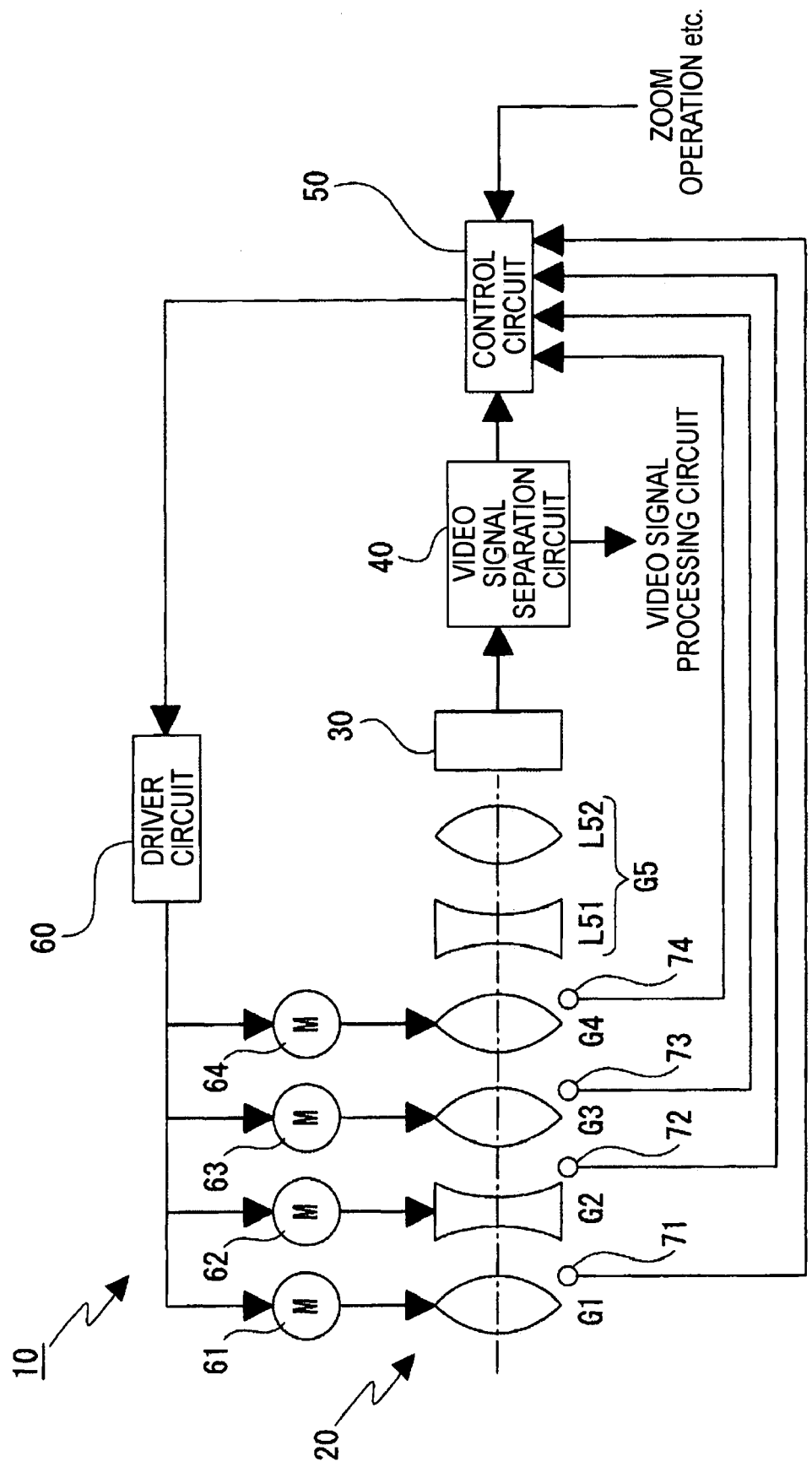
FIG. 15 is a block diagram of an image capturing apparatus according to an exemplary embodiment of the present invention.

FIG. 15 illustrates an image capturing apparatus according to an embodiment of the present invention.

An image capturing apparatus 10 includes a variable focal length lens system 20: The image capturing apparatus 10 further includes an image sensor 30 for converting an optical image formed by the variable focal length lens system 20 to an electrical signal. Examples of the image sensor 30 include a photoelectric transducer, such as a charged coupled device (CCD) and a complementary metal-oxide semiconductor (CMOS). The variable focal length lens system according to the above-described embodiments can be used as the variable focal length lens system 20. In FIG. 15, each of the lens groups in the variable focal length lens system 1 shown in FIG. 1 according to the first exemplary embodiment is simplified into a single lens. In place of the variable focal length lens system 1 according to the first exemplary embodiment, each of the variable focal length lens systems 2 and 3 according to the second and third exemplary embodiments can be used. Furthermore, a variable focal length lens system according to another embodiment can be used.

An electrical signal generated by the image sensor 30 is separated into a signal for controlling, the focus and a video signal by a video signal separation circuit 40. The signal for controlling the focus is transmitted to a control circuit 50. The video signal is transmitted to a video signal processing circuit. The video signal processing circuit processes the video signal into a format suitable for the subsequent processing, such as display by a display unit, recording on a recording medium, and transmission by a communication unit.

The control circuit 50 externally receives an operation signal, such as an operation signal from a zoom button, and performs a variety of processing in accordance with the operation signal. For example, when the control circuit 50 receives a zoom instruction from a zoom button, the control circuit 50 controls a driver circuit 60 to drive drive units 61 to 64. The drive units 61 to 64 move the lens groups G1, G2, G3, and G4 to predetermined positions, respectively, so as to achieve the instructed focal length. Sensors 71 to 74 detect the positional information about the lens groups G1, G2, G3, and G4 and input the positional information to the control circuit 50. The positional information is referenced by the control circuit 50 when the control circuit 50 outputs an instruction signal to the driver circuit 60. In addition, the control circuit 50 determines the focusing state on the basis of the signal transmitted by the video signal separation circuit 40. Subsequently, the control circuit 50 controls the drive unit 64 via the driver circuit 60. The drive unit 64 controls the position of the fourth lens group G4 so as to obtain an optimal focusing state.

The image capturing apparatus 10 can take a variety of forms as a finished product. For example, the image capturing apparatus 10 can be widely used as a camera unit of a digital input/output apparatus, such as a digital still camera, a digital video camera, a cell phone including a camera, or a personal digital assistant (PDA).

It should be understood by those skilled in the art that various modifications, combinations, sub-combinations and alterations may occur depending on design requirements and other factors insofar as they are within the scope of the appended claims or the equivalents thereof.

What is claimed is:

1. A variable focal length lens system comprising:
a first lens group having a positive refractive power, a second lens group having a negative refractive power, a third lens group having a positive refractive power, a fourth lens group having a positive refractive power, and a fifth lens group arranged in this order from an object side to an image plane side;
wherein, when a lens zoom position is changed from a wide-angle position at which a focal length of the variable focal length lens system is the shortest to a telephoto position at which the focal length is the longest, at least the first to fourth lens groups are movable and the second lens group is moved towards the image plane side and the third lens group is moved towards the object side so that a distance between the first lens group and the second lens group increases and a distance between the second lens group and the third lens group decreases, and the fourth lens group is moved along an optical axis direction so as to compensate for the change in the position of the image plane caused by the movement of each lens group, and wherein the fifth lens group includes a negative subgroup having a negative refractive power and a positive subgroup disposed on the image plane side of the negative subgroup and having a positive refractive power, and wherein the following conditional expression (1) is satisfied:

$$0.5 < (\beta 2t/\beta 2w)/Z < 0.85 \quad (1)$$

where
$\beta 2t$=the lateral magnification of the second lens group at the telephoto position,
$\beta 2w$=the lateral magnification of the second lens group at the wide-angle position, and
$Z$=a zoom ratio.

2. The variable focal length lens system according to claim 1, wherein the following conditional expression (2) is satisfied:

$$2.5 < |f5n|/fw < 5 \quad (2)$$

where
$f5n$=the focal length of the negative subgroup included in the fifth lens group, and
$fw$=the focal length of the whole variable focal length lens system at the wide-angle position.

3. The variable focal length lens system according to claim 1 or 2, wherein the fifth lens group is stationary in the optical axis direction regardless of the lens zoom position.

4. The variable focal length lens system according to claim 1 or 2, wherein an aperture stop is disposed adjacent to the third lens group and wherein the following conditional expression (3) is satisfied:

$$0.3 < Dsw/TLw < 0.4 \quad (3)$$

where
$Dsw$=a distance between the aperture stop and the image plane at the wide-angle position and
$TLw$=the total length of the variable focal length lens system at the wide-angle position.

5. The variable focal length lens system according to claim 1 or 2, wherein the following conditional expression (4) is satisfied:

$$0.25 < 1/|\beta 2t| < 0.45 \quad (4).$$

6. The variable focal length lens system according to claim 1 or 2, wherein the following conditional expression (5) is satisfied:

$$0.8 < R5n/Bf < 1.5 \quad (5)$$

where
$R5n$=the radius of curvature of the lens surface of a lens included in the negative lens subgroup of the fifth lens group and located closest to the image plane, and
$Bf$=the distance between a lens included in the positive lens subgroup of the fifth lens group and located closest to the image plane and the image plane.

7. An image capturing apparatus comprising:
a variable focal length lens system including a first lens group having a positive refractive power, a second lens group having a negative refractive power, a third lens group having a positive refractive power, a fourth lens group having a positive refractive power, and a fifth lens group arranged in this order from an object side to an image plane side; and
an image sensor for converting an optical image formed through the variable focal length lens system to an electrical signal;
wherein, when a lens zoom position is changed from a wide-angle position at which a focal length of the variable focal length lens system is the shortest to a telephoto position at which the focal length is the longest, at least the first to fourth lens groups are movable and the second lens group is moved towards the image plane side and the third lens group is moved towards the object side so that a distance between the first lens group and the second lens group increases and a distance between the second lens group and the third lens group decreases, and the fourth lens group is moved along an optical axis direction so as to compensate for the change in the position of the image plane caused by the movement of each lens group, and wherein the fifth lens group includes a negative subgroup having a negative refractive power and a positive subgroup disposed on the image plane side of the negative subgroup and having a positive refractive power, and wherein the following conditional expression (1) is satisfied:

$$0.5 < (\beta 2t/\beta 2w)/Z < 0.85 \quad (1)$$

where
$\beta 2t$=the lateral magnification of the second lens group at the telephoto position,
$\beta 2w$=the lateral-magnification of the second lens group at the wide-angle position, and
$Z$=a zoom ratio.

8. The image capturing apparatus according to claim 7, wherein the following conditional expression (2) is satisfied:

$$2.5 < |f5n|/fw < 5 \quad (2)$$

where
$f5n$=the focal length of the negative subgroup included in the fifth lens group, and
$fw$=the focal length of the whole variable focal length lens system at the wide-angle position.

* * * * *